United States Patent
Xu et al.

(10) Patent No.: US 11,741,688 B2
(45) Date of Patent: Aug. 29, 2023

(54) IMAGE PROCESSING METHOD AND APPARATUS, ELECTRONIC DEVICE, AND STORAGE MEDIUM

(71) Applicant: TENCENT TECHNOLOGY (SHENZHEN) COMPANY LIMITED, Shenzhen (CN)

(72) Inventors: Pei Xu, Shenzhen (CN); Shan Huang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 197 days.

(21) Appl. No.: 17/326,285

(22) Filed: May 20, 2021

(65) Prior Publication Data

US 2021/0271917 A1    Sep. 2, 2021

Related U.S. Application Data

(63) Continuation of application No. PCT/CN2020/085010, filed on Apr. 16, 2020.

(30) Foreign Application Priority Data

Apr. 29, 2019    (CN) .......................... 201910356240.8

(51) Int. Cl.
*G06K 9/46*    (2006.01)
*G06K 9/66*    (2006.01)
(Continued)

(52) U.S. Cl.
CPC .......... *G06V 10/454* (2022.01); *G06F 18/213* (2023.01); *G06F 18/24* (2023.01);
(Continued)

(58) Field of Classification Search
None
See application file for complete search history.

(56) References Cited

U.S. PATENT DOCUMENTS 7,062,085 B2 *  6/2006  Luo ..................... G06T 7/168
                                                   382/165
8,594,435 B2 * 11/2013  Kinoshita ............ G06T 7/11
                                                   382/113
(Continued)

FOREIGN PATENT DOCUMENTS

CN    1987894 A  *  6/2007
CN    1987894 A      6/2007
(Continued)

OTHER PUBLICATIONS

Wikipedia, matrix (mathematics), published on Mar. 22, 2019 (Year: 2019).*

(Continued)

*Primary Examiner* — Feng Niu
(74) *Attorney, Agent, or Firm* — Anova Law Group, PLLC

(57) ABSTRACT

An image processing method is provided to be performed by an electronic device. The method includes: obtaining a target image including a text object, and determining a region proposal in the target image corresponding to the text object; obtaining region proposal feature information of the region proposal, and generating an initial mask according to the region proposal feature information; and restoring the initial mask to a target binary mask, determining a mask connection region in the target binary mask, and determining a text image region associated with the text object in the target image according to the mask connection region.

18 Claims, 12 Drawing Sheets

(51) Int. Cl.
  *G06V 10/44* (2022.01)
  *G06V 20/62* (2022.01)
  *G06F 18/24* (2023.01)
  *G06F 18/213* (2023.01)
  *G06F 18/25* (2023.01)
  *G06V 30/19* (2022.01)
  *G06V 10/82* (2022.01)
  *G06V 20/10* (2022.01)

(52) U.S. Cl.
  CPC ............ *G06F 18/253* (2023.01); *G06V 10/82* (2022.01); *G06V 20/10* (2022.01); *G06V 20/62* (2022.01); *G06V 30/19173* (2022.01)

(56) References Cited

U.S. PATENT DOCUMENTS

| | | | | |
|---|---|---|---|---|
| 9,020,269 | B2* | 4/2015 | Nakao | H04N 23/951 |
| | | | | 348/E5.079 |
| 9,298,980 | B1* | 3/2016 | Yuan | G06V 30/413 |
| 9,349,062 | B2* | 5/2016 | Mei | G06V 30/162 |
| 9,466,009 | B2* | 10/2016 | Jaber | G06T 7/50 |
| 10,713,794 | B1* | 7/2020 | He | G06V 10/764 |
| 2003/0053686 | A1* | 3/2003 | Luo | G06T 7/168 |
| | | | | 382/165 |
| 2008/0137153 | A1* | 6/2008 | Kunori | G06V 20/80 |
| | | | | 358/462 |
| 2011/0188758 | A1* | 8/2011 | Kinoshita | G06T 7/223 |
| | | | | 382/195 |
| 2013/0129221 | A1* | 5/2013 | Nakao | H04N 23/667 |
| | | | | 382/190 |
| 2015/0131908 | A1 | 5/2015 | Mei et al. | |
| 2015/0161474 | A1* | 6/2015 | Jaber | G06V 20/63 |
| | | | | 382/203 |

FOREIGN PATENT DOCUMENTS

| | | | | |
|---|---|---|---|---|
| CN | 102999753 | A | * | 3/2013 |
| CN | 102999753 | A | | 3/2013 |
| CN | 104123550 | A | | 10/2014 |
| CN | 104298982 | A | | 1/2015 |
| CN | 108764063 | A | * | 11/2018 ........... G06K 9/0063 |
| CN | 108764063 | A | | 11/2018 |
| CN | 109977956 | A | | 7/2019 |

OTHER PUBLICATIONS

The World Intellectual Property Organization (WIPO) International Search Report for PCT/CN2020/085010 dated Jul. 9, 2020 6 Pages (including translation).

J. Almazan et al., "Segmentation-Free Word Spotting with Exemplar SVMs," Pattern Recognition, vol. 47, No. 12, 2014. 21 pages.

J. Almazan et al., "Word Spotting and Recognition with Embedded Attributes," IEEE Transactions on Pattern Analysis and Machine Intelligence, vol. 36, No. 12, 2014. 17 pages.

L. Rothacker et al., "Segmentation-free Query-by-String Word Spotting with Bag-of-Features HMMs," in13th International Conference on Document Analysis and Recognition (ICDAR), 2015. 5 pages.

T. Wilkinson et al., "Neural Ctrl-F: Segmentation-free Query-by-String Word Spotting in Handwritten Manuscript Collections," in IEEE International Conference on Computer Vision (ICCV), 2017. 10 pages.

P. Lyu et al., "Mask TextSpotter: An End-to-End Trainable Neural Network for Spotting Text with Arbitrary Shapes," in Proceedings of the European Conference on Computer Vision (ECCV), 2018. 17 pages.

K. He et al., "Mask R-CNN," in Proceedings of the IEEE international conference on computer vision, 2017, pp. 2961-2969. 9 pages.

V. Frinken et al., "A Novel Word Spotting Method Based on Recurrent Neural Networks," IEEE Transactions on Pattern Analysis and Machine Intelligence, vol. 34, No. 2, pp. 211-224, 2012. 14 pages.

H. Zhang et al., "Keyword Spotting in Online Chinese Handwritten Documents with Candidate Scoring Based on Semi-CRF Model," in12th International Conference on Document Analysis and Recognition (ICDAR), 2013, pp. 567-571. 5 pages.

H. Zhang et al., "Character confidence based on N-best list for keyword spotting in online Chinese handwritten documents," Pattern Recognition, vol. 47, No. 5, pp. 1880-1890, 2014. 11 pages.

H. Zhang et al., "Keyword spotting in hand-written Chinese documents using semi-markov conditional random fields," Engineering Applications of Artificial Intelligence, vol. 58, pp. 49-61, 2017. 13 pages.

S. K. Ghosh et al., "Query by String word spotting based on character bi-gram indexing," in 13th International Conference on Document Analysis and Recognition (ICDAR), 2015. 6 pages.

D. G. Lowe, "Distinctive Image Features from Scale-Invariant Keypoints," International journal of computer vision, vol. 60, No. 2, pp. 91-110, 2004. 20 pages.

M. Liao et al., "Textboxes++: A Single-Shot Oriented Scene Text Detector," IEEE transactions on image processing, vol. 27, No. 8, 2018. 15 pages.

* cited by examiner

IMAGE PROCESSING METHOD AND APPARATUS, ELECTRONIC DEVICE, AND STORAGE MEDIUM

RELATED APPLICATION(S)

This application is a continuation application of PCT Patent Application No. PCT/CN2020/085010, filed on Apr. 16, 2020, which claims priority to Chinese Patent Application No. 201910356240.8, entitled "IMAGE PROCESSING METHOD AND APPARATUS, ELECTRONIC DEVICE, AND STORAGE MEDIUM" and filed with the National Intellectual Property Administration, PRC on Apr. 29, 2019, all of which are incorporated herein by reference in entirety.

FIELD OF THE TECHNOLOGY

The present disclosure relates to the field of computer technologies, and in particular, to an image processing method and apparatus, an electronic device, and a storage medium.

BACKGROUND

With the development of technologies, there are increasingly more manners for obtaining an image. Various aspects of people's daily life may be recorded in the form of images by using devices such as a video recorder, a camera, and a mobile phone. Word information in an image may reflect content of the image. Therefore, recognizing location information of a text in the image is helpful for subsequent image segmentation and image retrieval.

SUMMARY

In one aspect, the present disclosure provides an image processing method, performed by an electronic device, the method including: obtaining a target image including a text object, and determining a region proposal in the target image corresponding to the text object; obtaining region proposal feature information of the region proposal, and generating an initial mask according to the region proposal feature information; and restoring the initial mask to a target binary mask, determining a mask connection region in the target binary mask, and determining a text image region associated with the text object in the target image according to the mask connection region.

In yet another embodiment, the present disclosure provides an image processing apparatus, including: an image obtaining module, configured to obtain a target image including a text object; a region proposal determining module, configured to determine a region proposal in the target image corresponding to the text object; a feature obtaining module, configured to obtain region proposal feature information of the region proposal; a recognition module, configured to generate an initial mask according to the region proposal feature information; a restoring module, configured to restore the initial mask to a target binary mask; a connection region determining module, configured to determine a mask connection region in the target binary mask; and a target region determining module, configured to determine a text image region associated with the text object in the target image according to the mask connection region.

In yet another aspect, the present disclosure provides an image processing apparatus. The image processing apparatus includes: a memory storing computer program instructions; and a processor coupled to the memory and configured to execute the computer program instructions and perform: obtaining a target image including a text object, and determining a region proposal in the target image corresponding to the text object; obtaining region proposal feature information of the region proposal, and generating an initial mask according to the region proposal feature information; and restoring the initial mask to a target binary mask, determining a mask connection region in the target binary mask, and determining a text image region associated with the text object in the target image according to the mask connection region.

In yet another aspect, the present disclosure provides a non-transitory computer-readable storage medium storing computer program instructions executable by at least one processor to perform: obtaining a target image including a text object, and determining a region proposal in the target image corresponding to the text object; obtaining region proposal feature information of the region proposal, and generating an initial mask according to the region proposal feature information; and restoring the initial mask to a target binary mask, determining a mask connection region in the target binary mask, and determining a text image region associated with the text object in the target image according to the mask connection region.

Other aspects of the present disclosure can be understood by those skilled in the art in light of the description, the claims, and the drawings of the present disclosure.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

DETAILED DESCRIPTION

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

Throughout the description, and when applicable, "some embodiments" or "certain embodiments" describe subsets of all possible embodiments, but it may be understood that the "some embodiments" or "certain embodiments" may be the same subset or different subsets of all the possible embodiments, and can be combined with each other without conflict.

In one or more embodiments of the present disclosure, the term "based on" is employed herein interchangeably with the term "according to."

Generally, location information of a text in an image is recognized manually, that is, a text location in the image is determined and labeled manually, and image segmentation or image understanding is subsequently performed on the image according to a result of the manual determining. However, processes such as manual determining and manual labeling required for manually recognizing the location information of the text in the image take a lot of time and cause low efficiency in recognizing the text location in the image.

The artificial intelligence (AI) technology is a comprehensive discipline, and relates to a wide range of fields including both hardware-level technologies and software-level technologies. The basic AI technologies generally include technologies such as a sensor, a dedicated AI chip, cloud computing, distributed storage, a big data processing technology, an operating/interaction system, and electromechanical integration. AI software technologies mainly include several major directions such as a computer vision (CV) technology, a speech processing technology, a natural language processing technology, and machine learning/deep learning (DL).

Currently, DL is a technology of machine learning and one of research fields. AI is implemented in a computer system by building an artificial neural network with a hierarchical structure.

Due to successful implementation of DL in the vision field, researchers also introduce DL to the field of image processing, and a DL neural network model is trained by using a large quantity of training images, so that the model can perform image processing such as recognize a location region of a text and a location region of a keyword in an image.

An embodiment of the present disclosure provides an image processing method, which can automatically recognize a location region of a text and a location region of a keyword in a text image, so as to improve efficiency in recognizing the text location and the keyword location.

Figure 1:
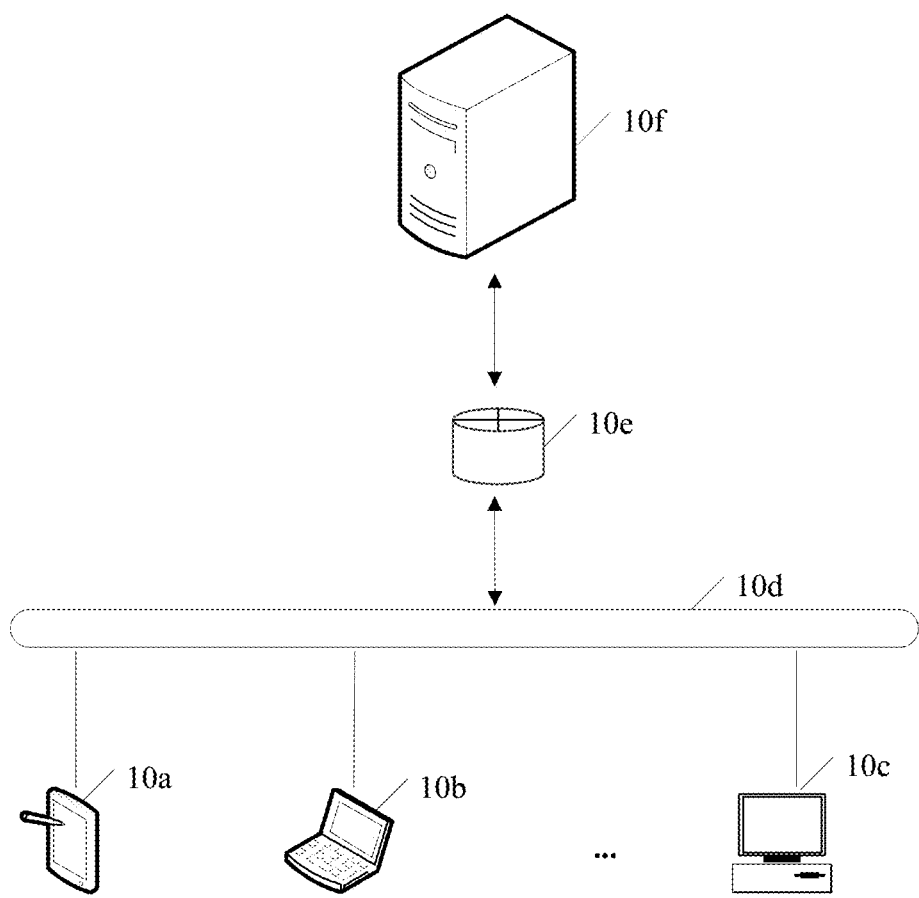
FIG. 1 is a system architecture diagram of image processing according to an embodiment of the present disclosure.

FIG. 1 is a system architecture diagram of image processing to which an image processing method according to an embodiment of the present disclosure is applicable. A server 10f establishes a connection to a user terminal cluster by using a switch 10e and a communication bus 10d. The user terminal cluster may include: a user terminal 10a, a user terminal 10b, . . . , and a user terminal 10c.

Using the user terminal 10a as an example, when receiving a text image including a text and a keyword, the user terminal 10a transmits the text image to the server 10f by using the switch 10e and the communication bus 10d. The server 10f may recognize a location region of the text in the text image and a location region of the keyword in the text image. The server may transmit a result of the recognition to the user terminal 10a. Subsequently, the user terminal 10a may display the text image on a screen, and mark the location region of the text and the location region of the keyword in the text image on the screen.

In certain embodiments, the user terminal 10a may alternatively recognize the location region of the text and the location region of the keyword in the text image, and display the text image on the screen and mark the location region of the text and the location region of the keyword in the text image on the screen.

Detailed descriptions are made in the following by using how the user terminal 10a recognizes a location region of a text in an image and a location region of a keyword in the text as an example. The user terminal 10a, the user terminal 10b, and the user terminal 10c, and the like shown in FIG. 1 may include a mobile phone, a tablet computer, a notebook computer, a palmtop computer, a mobile Internet device (MID), a wearable device (for example, a smart watch or a smart band), and the like.

Figure 2A:
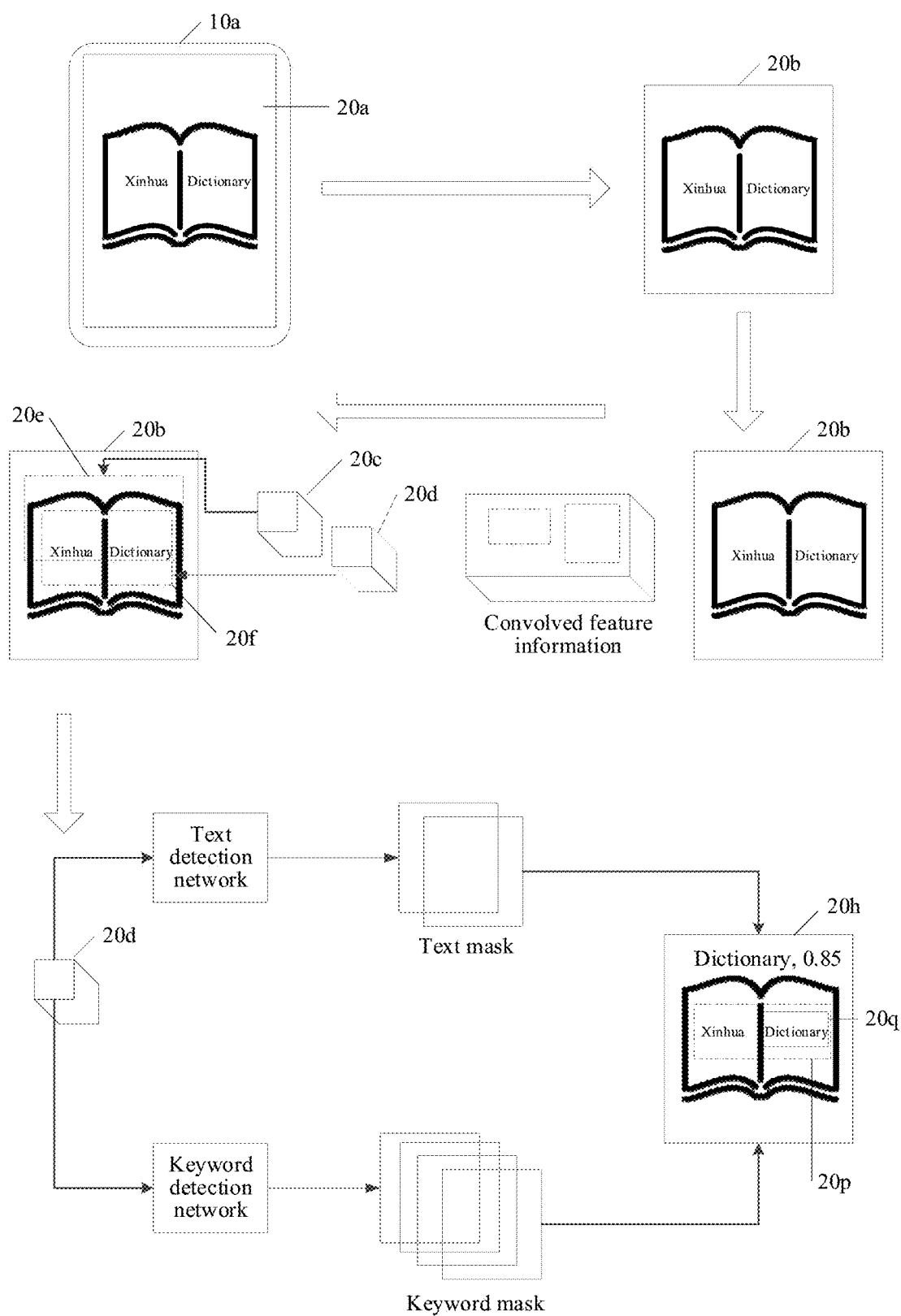
FIG. 2A and FIG. 2B are schematic diagrams of scenarios of image processing according to one or more embodiments of the present disclosure.
Figure 2B:
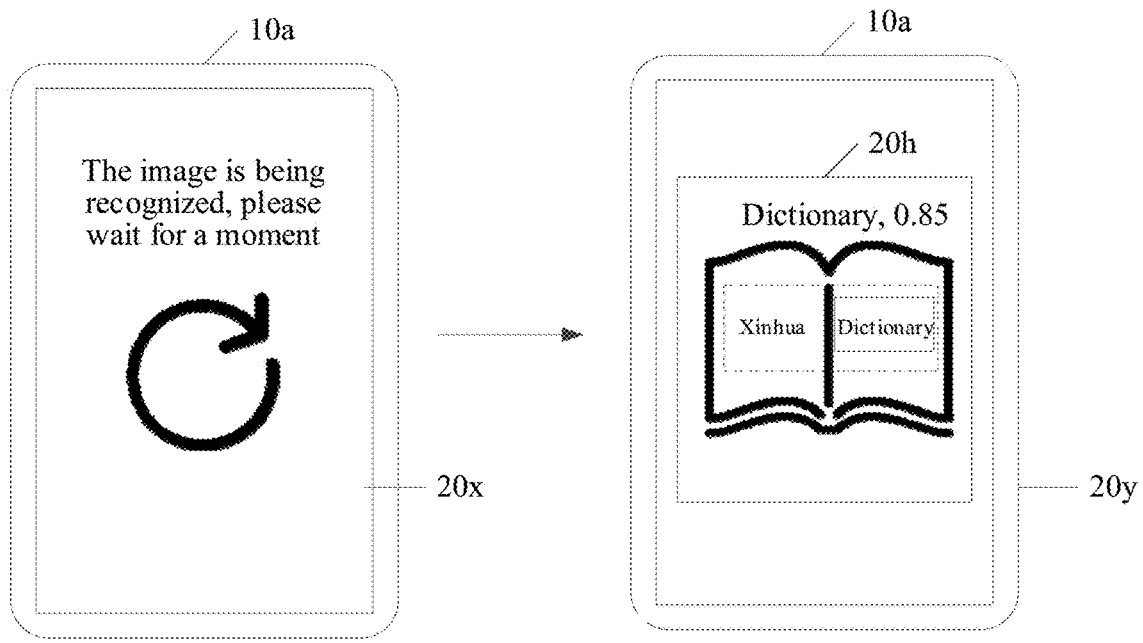

FIG. 2A and FIG. 2B are schematic diagrams of scenarios of image processing according to an embodiment of the present disclosure. As shown in an interface 20a in FIG. 2A, the user terminal 10a obtains a to-be-recognized image 20b, the image 20b including a text "Xinhua Dictionary". The user terminal 10a inputs the image 20b into a region extraction network, to extract convolved feature information of the image 20b based on the region extraction network. A plurality of pieces of unit convolved feature information are extracted from the convolved feature information of the image 20b according to a preset size and an aspect ratio. For example, a size of the unit convolved feature information is 4×4×256, and an aspect ratio is 1:1. Alternatively, a size of the unit convolved feature information is 8×16×256, and an aspect ratio is 1:2.

A convolutional neural network (CNN) is a feedforward neural network including convolution operations and having a depth structure, and is one of representative DL algorithms.

In a convolutional layer of the CNN, a neuron is connected to only some neurons of an adjacent layer. The convolutional layer of the CNN usually includes a plurality of feature maps. Each feature map includes some neurons arranged in a rectangular shape, and neurons of the same feature map share a weight. The weight shared herein is a convolution kernel. The convolution kernel generally is initialized in the form of a random decimal matrix. During the training of the network, a proper weight is obtained as the convolution kernel through learning.

Therefore, there may be a plurality of convolution kernels in convolutional layers. When content inputted into the CNN is an image, different convolved feature information of the image is extracted by performing convolution operations on the inputted image and the plurality of convolution kernels. A first convolutional layer may extract only some low-level convolved feature information, for example, levels such as edges, lines, and corners, and a higher-level convolutional layer can further iterate to extract more complex convolved feature information from the low-level convolved feature information. For example, if a size of the convolved feature information is (128,128,256) the convolved feature information may be considered as including 256 feature maps with a resolution of 128×128. Each pixel in the feature map may be considered as a 256-dimensional vector, and there are a total quantity of 128×128 pixels.

Descriptions are made in the following by using an example in which two pieces of unit convolved feature information (unit convolved feature information 1 and unit convolved feature information 2) are extracted from the convolved feature information of the image 20b. Pooling is performed on the unit convolution feature information 1 and the unit convolution feature information 2 based on a pooling layer in the region extraction network to obtain pooled feature information 20c and pooled feature information 20d respectively.

The pooling, that is, a pooling operation, is an important concept in the CNN and is actually a form of downsampling. The pooling operation includes a plurality of pooling functions in different forms such as an average pooling function and a max pooling function. The max pooling is to divide the inputted image into a plurality of rectangular regions and output a maximum value for each region. The pooling function used during the pooling is not limited in the present disclosure.

The pooled feature information is feature information obtained after the pooling operation is performed on the convolved feature information. When a required data size of obtained pooled feature information is p×p, unit regional convolved feature information is divided into data blocks of p×p through a pooling operation, p being a preset positive integer. A maximum value is calculated (that is, the max pooling is performed) in each data block as a representation of the data block. Alternatively, an average value is calculated (that is, the average pooling is performed) in each data block as a representation of the data block.

For example, when the max pooling is performed on the unit convolved feature information 1 and the unit convolved feature information 2, the unit convolved feature information 1 and the unit convolved feature information 2 are each divided into data blocks of p×p, a maximum value is calculated in each data block as a representation of the data block, and finally obtained representations of the data blocks are the pooled feature information 20c corresponding to the unit convolved feature information 1 and the pooled feature information 20d corresponding to the unit convolved feature information 2.

A foreground factor corresponding to the pooled feature information 20c may be recognized based on a classifier in the region extraction network. An offset factor corresponding to the pooled feature information 20c may be recognized based on a regressor in the region extraction network. Each piece of pooled feature information may correspond to a region in the image 20b, and a size of the pooled feature information is greater than a size of the corresponding region in the image 20b. The foreground factor is used for indicating a probability that the corresponding region includes a text, and the offset factor is used for indicating an offset of the corresponding region (or may be an adjustment amount of the region).

As shown in FIG. 2A, a corresponding region 20e may be determined in the image 20b according to a mapping relationship between the pooled feature information 20c and the image 20b, and the offset factor corresponding to the pooled feature information 20c. Similarly, a foreground factor and an offset factor of the pooled feature information 20d may be determined based on the classifier and the regressor in the region extraction network, and a corresponding region 20f may be determined in the image 20b according to a mapping relationship between the pooled feature information 20d and the image 20b, and the offset factor corresponding to the pooled feature information 20d.

It can be learned that each piece of pooled feature information corresponds to a region in the image 20b. The region may be considered as a region of interest (ROI) of the text "Xinhua Dictionary" in the image 20b. Due to an overlap between a plurality of ROIs, it may be desirable to select an optimal region proposal from the plurality of ROIs.

From the region 20e and the region 20f, the region 20f may be selected as a region proposal according to non-maximum suppression (NMS), the foreground factor of the region 20e, the foreground factor of the region 20f, and the overlapping area between the region 20e and the region 20f.

The user terminal 10a inputs the pooled feature information 20d of the selected region proposal (that is, the region 20f) into a text detection network. The text detection network may output text masks of two categories, one of which is a text background category and the other is a text category. The user terminal 10a may determine a location region 20p of the text "Xinhua Dictionary" in the image 20b according to the two text masks, and mark the location region 20p in the image 20b in the form of a dashed-line rectangle.

The user terminal 10a inputs the pooled feature information 20d of the selected region proposal (that is, the region 20f) into a keyword detection network. The keyword detection network may output keyword masks of k+1 categories, one of which is a keyword background category, and the other k categories respectively correspond to k preset keywords (for example, a keyword "Dictionary" and keywords "mobile phone"). The user terminal 10a may determine a location region 20q of a keyword "Dictionary" in the text "Xinhua Dictionary" in the image 20b according to the k+1 keyword masks, and mark the location region 20q in the form of a solid-line rectangle in the image 20b.

In addition to the dashed-line rectangle and the solid-line rectangle, the location region 20p and the location region 20q may be marked in the image 20b by using rectangles with lines of different thicknesses or rectangles in different colors, so that the region 20p and the region 20q can be distinguished in the image 20b.

After determining location regions of keywords in the text "Xinhua Dictionary" in the image 20b, the user terminal 10a calculates a confidence level of each of the k keywords according to the location regions, and uses the keyword "Dictionary" corresponding to a highest confidence level of 0.85 as a keyword contained in the region 20q. The image 20b may be labeled the keyword "Dictionary" and the highest confidence level of 0.85.

As shown in FIG. 2A, an image 20h labeled the keyword "Dictionary" and the corresponding confidence level of 0.85 may be obtained with the location region of the text "Xinhua Dictionary" being marked with a rectangle, and the location region of the keyword "Dictionary" being marked with a rectangle.

As shown in an interface 20x in FIG. 2B, during the recognition of the image 20b, the user terminal 10a may play a preset animation on the screen. As shown in an interface 20y, when it is detected that the recognition of the image 20b has been performed, the animation playing is stopped, and the image 20h with marked locations is displayed on the screen.

Reference may be made to the following embodiments corresponding to FIG. 3 to FIG. 10 for specific processes of extracting first pooled feature information (such as the pooled feature information 20c and the pooled feature information 20d in the foregoing embodiment), recognizing location information of the text in the image, and recognizing location information of the keyword in the image.

Figure 3:
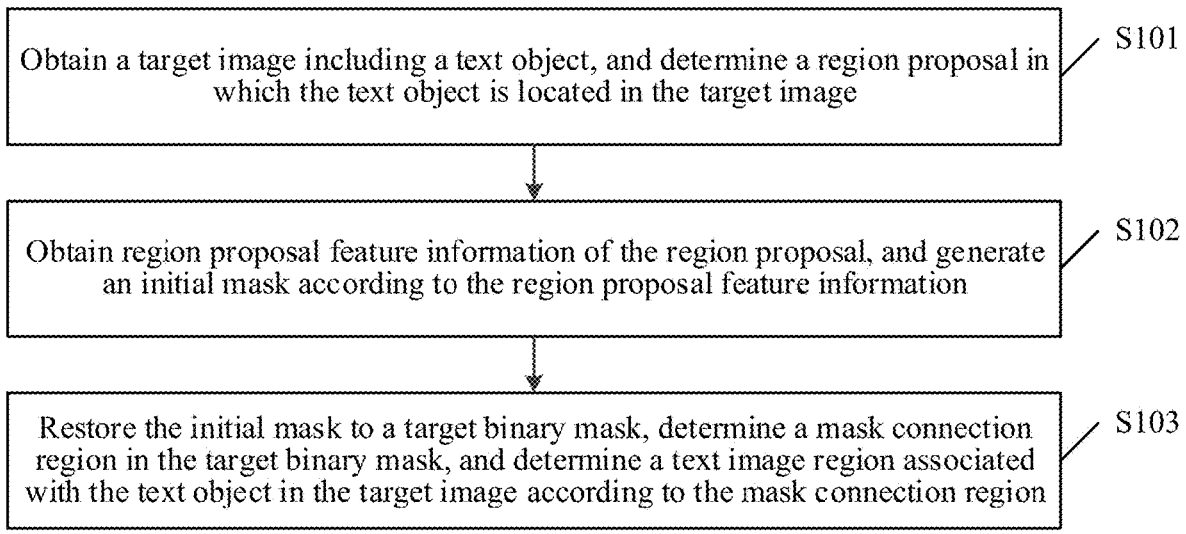
FIG. 3 is a schematic flowchart of an image processing method according to one or more embodiments of the present disclosure.

FIG. 3 is a schematic flowchart of an image processing method according to an embodiment of the present disclosure. The method may be performed by an electronic device. The electronic device may be the user terminal 10a in FIG. 1 or may be the server 10f in FIG. 1. As shown in FIG. 3, the image processing method may include the following steps.

Step S101. Obtain a target image including a text object, and determine a region proposal in which the text object is located in the target image.

Specifically, a terminal device (such as the user terminal 10a in the foregoing embodiment corresponding to FIG. 2A) obtains a to-be-recognized image, referred to as a target image (such as the image 20b in the foregoing embodiment corresponding to FIG. 2A), the target image including a text object (such as the text "Xinhua Dictionary" in the foregoing embodiment corresponding to FIG. 2A), the text object including a keyword, and the text object may be text information.

The terminal device obtains a target feature pyramid network (FPN), the target FPN being configured to extract convolved feature information of a plurality of sizes (or a plurality of levels or scales) from the target image, to resolve a multi-scale problem in text detection. The target FPN includes a plurality of convolutional layers. Each of the convolutional layers may extract convolved feature information of a different data size (such as the convolved feature information in the foregoing embodiment corresponding to FIG. 2A).

Descriptions are made in the following by using a first convolutional layer and a second convolutional layer as an example. In the target FPN, the top layer is a second convolutional layer, and the others are first convolutional layers. In other words, a data size of convolved feature information extracted by the first convolutional layer is greater than a data size of convolved feature information extracted by the second convolutional layer.

When the target FPN includes a plurality of convolutional layers, a convolutional layer located at the top layer of the target FPN is used as a second convolutional layer, and remaining convolutional layers are all used as first convolutional layers. Then a convolutional layer located at the top of the first convolutional layers in the target FPN is extracted as a new second convolutional layer, and remaining convolutional layers are used as new first convolutional layers. The rest is deduced by analogy, until all the convolutional layers are involved in the operation.

Detailed descriptions of extracting convolved feature information of different sizes respectively by using the first convolutional layer and the second convolutional layer are made below. A convolution operation is performed on the target image based on the first convolutional layer in the target FPN, to obtain feature information, referred to as first original feature information. In other words, the first original feature information is convolved feature information obtained by performing the convolution operation on the target image based on the first convolutional layer, and may also be considered as a plurality of feature maps.

Each convolutional layer corresponds to one or more convolution kernels (which may also be referred to as filters or receptive fields). The convolution operation refers to a matrix multiplication operation between the convolution kernel and subdata at different locations of inputted data. A quantity of data output channels of each convolutional layer is determined by a quantity of convolution kernels in the convolutional layer, and a height $H_{out}$ and a width $W_{out}$ of outputted data (that is, a feature map) are jointly determined by a size of the inputted data, a size of the convolution kernel, a stride, and a boundary padding, that is, $H_{out}=(H_{in}-H_{kernel}+2*padding)/stride+1$ and $W_{out}=(W_{in}-W_{kernel}+2*padding)/stride+1$. $H_{in}$, $H_{kernel}$ respectively represent a height of the inputted data and a height of the convolution kernel, and $W_{in}$, $W_{kernel}$ respectively represent a width of the inputted data and a width of the convolution kernel.

A convolution operation is performed on the first original feature information based on the second convolutional layer in the target FPN, to obtain feature information, referred to as second original feature information. As a quantity of convolution operations increase, a data size of obtained feature information is constantly decreased, and a quantity of channels of feature information is constantly increased.

Figure 4:
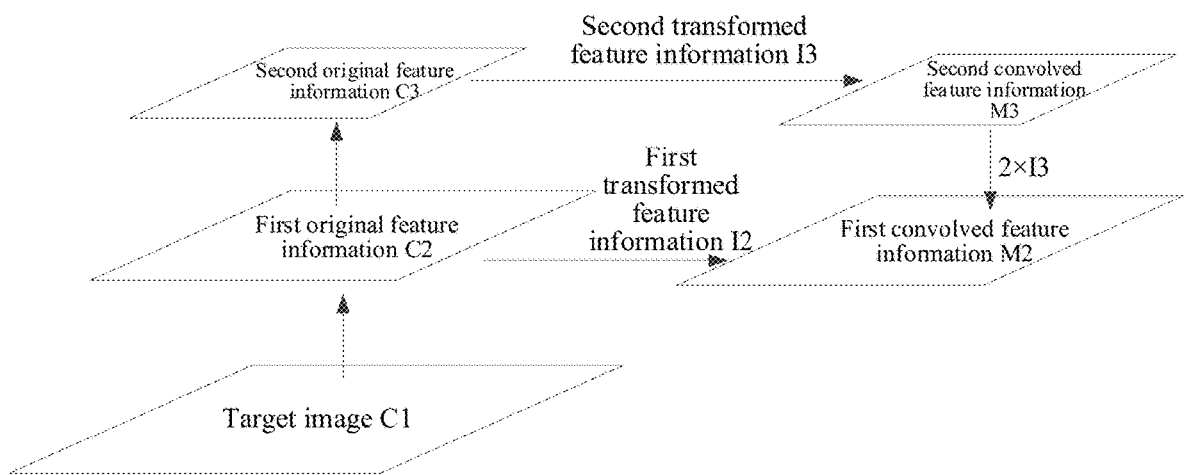
FIG. 4 is a schematic diagram of determining convolved feature information according to one or more embodiments of the present disclosure.

FIG. 4 is a schematic diagram of determining convolved feature information according to an embodiment of the present disclosure. As shown in FIG. 4, a size of a target image C1 is (H,W,3). After a convolution operation of the first convolutional layer, a size of obtained first original feature information $$C2 \text{ is } \left(\frac{H}{4}, \frac{W}{4}, 256\right),$$

that is, a data size of the first original feature information $$C2 \text{ is } \frac{H}{4} \times \frac{W}{4},$$

and a quantity of data channels is 256. After a convolution operation of the second convolutional layer is performed on the first original feature information C2, a size of obtained second original feature information C3 is $$\left(\frac{H}{8}, \frac{W}{8}, 512\right).$$

The quantity of data channels of the first original feature information is adjusted to obtain first transformed feature information, and the quantity of data channels of the second original feature information is adjusted to obtain second transformed feature information. The first transformed feature information and the second transformed feature information have the same quantity of data channels, and the quantity of data channels is equal to a quantity of data channels of original feature information determined by a lowest convolutional layer in the target FPN. The quantities of data channels of the feature information are adjusted to subsequently superpose feature information extracted by different convolutional layers.

The quantities of data channels are also adjusted through a convolution operation. In this case, a size of a convolution kernel is 1×1, and a quantity of convolution kernels is equal to a quantity of data channels of the original feature information determined by the lowest convolutional layer in the target FPN. After the adjustment, it can be ensured that data sizes of feature information (or feature maps) of all the layers remain unchanged, but the quantities of data channels are the same.

Therefore, the first transformed feature information is obtained by performing a convolution operation on the first original feature information and a convolution kernel with a size of 1×1 and a quantity equal to the quantity of data channels of the original feature information determined by the lowest convolutional layer in the target FPN, and the second transformed feature information is obtained by performing a convolution operation on the second original feature information and a convolution kernel with a size of 1×1 and a quantity equal to the quantity of data channels of the original feature information determined by the lowest convolutional layer in the target FPN.

Upsampling is performed on the second transformed feature information to obtain third transformed feature information. The upsampling may be performed in a manner of interpolation or deconvolution. A data size of the third transformed feature information is equal to a data size of the first transformed feature information. The terminal device superposes the third transformed feature information and the first transformed feature information to obtain fourth transformed feature information. It can be learned that the fourth transformed feature information is obtained by combining feature information (the second transformed feature information) at a high layer and feature information (the first transformed feature information) at an underlying layer.

The terminal device uses the fourth transformed feature information as first convolved feature information, and uses the second transformed feature information as second convolved feature information. The first convolved feature information and the second convolved feature information may be combined into hierarchical convolved feature information of the target image, the first convolved feature information corresponds to a first size, and the second convolved feature information corresponds to a second size. It can be learned that the first size is greater than the second size. A smaller scale indicates a larger data size of the corresponding feature information (that is, a larger height and width of a feature map).

Still using FIG. 4 as an example, the quantity of data channels of the first original feature information $$C2^{(\frac{H}{4},\frac{W}{4},256)}$$

is adjusted to obtain first transformed feature information $$I2^{(\frac{H}{4},\frac{W}{4},256)},$$

and the quantity of data channels of the second original feature information $$C3^{(\frac{H}{8},\frac{W}{8},512)}$$

is adjusted to obtain second transformed feature information $$I3^{(\frac{H}{8},\frac{W}{8},256)}$$

There are only two pieces of original feature information herein, and therefore, in the two pieces of original feature information, the quantity of data channels of the first original feature information with a smaller quantity of data channels remains unchanged as 256, and the quantity of data channels of the second original feature information with a larger quantity of data channels is adjusted from 512 to 256.

The second transformed feature information $$I3^{(\frac{H}{8},\frac{W}{8},256)}$$

may be used as second convolved feature information $$M3^{(\frac{H}{8},\frac{W}{8},256)}.$$

Upsampling is performed on the second transformed feature information $$I3^{(\frac{H}{8},\frac{W}{8},256)}$$

to obtain third transformed feature information $$2I3^{(\frac{H}{4},\frac{W}{4},256)}.$$

The third transformed feature information $$2I3^{(\frac{H}{4},\frac{W}{4},256)}$$

and the first transformed feature information $$I2^{(\frac{H}{4},\frac{W}{4},256)}$$

are superposed to obtain fourth transformed feature information M2 (M2=I2+2I3). A size of the fourth transformed feature information $$M2 \text{ is } ^{(\frac{H}{4},\frac{W}{4},256)},$$

and the fourth transformed feature information $$M2^{(\frac{H}{4},\frac{W}{4},256)}$$

may be used as first convolved feature information.

In general, convolved feature information at different levels and with different sizes and scales may be extracted based on the target FPN. Convolved feature information (feature maps) of each layer fuses features of different resolutions and different semantic intensities. In this way, each layer is ensured to have an appropriate resolution and intense semantic features. In addition, this method adds only an additional cross-layer connection (that is, the foregoing superposition step) based on a CNN, which almost consumes no additional time and calculation.

An ROI is determined from the first convolved feature information based on a target region proposal network (RPN) as a first ROI, and an ROI is determined from the second convolved feature information based on the target RPN as a second ROI. That is, ROIs are respectively determined from convolved feature information corresponding to different levels based on the target RPN. The first ROI and the second ROI indicate regions in the target image.

The target RPN includes a convolutional layer, a pooling layer, a classifier, and a regressor. The convolutional layer is configured to extract regional convolved feature information, the pooling layer is configured to pool the regional convolved feature information to the same size, the classifier is configured to recognize a probability that an image region corresponding to the pooled regional convolved feature information includes a text, and the regressor is configured to adjust the image region corresponding to the pooled regional convolved feature information.

Detailed descriptions are made below by using an example in which the target RPN determines the first ROI from the first convolved feature information. Similarly, the second ROI may be determined from the second convolved feature information based on the target RPN.

A convolution operation is performed on the first convolved feature information based on the convolutional layer in the target RPN, to obtain feature information, referred to as regional convolved feature information. The regional convolved feature information is also a feature map. For example, if a size of the convolved feature information is (128,128,256), the convolved feature information may be considered as including 256 feature maps with a resolution of 128×128. Each pixel in the feature map may be considered as a 256-dimensional vector, and there are a total quantity of 128×128 pixels. The size of the feature map is less than that of the target image. Therefore, any pixel in the feature map may correspond to an anchor region in the target image (in certain embodiments, the region is relatively small, for example, 4×4 or 8×8). The size of the anchor region is determined by a proportional relationship between the target image and the first convolved feature information.

The terminal device obtains a plurality of aspect ratio factors, for example, the aspect ratio factors may be 0.1:1, 0.2:1, 0.5:1, 1:1, 1:2, 5:1, and 10:1, and obtains a size factor corresponding to the first size of the first convolved feature information. The terminal device may obtain a plurality of auxiliary regions by using the anchor region in the target image as a center. Areas of all the auxiliary regions are the same. The area of the auxiliary region is determined by the size factor, and an aspect ratio of the auxiliary region is determined by the aspect ratio factor. In this way, by using each anchor region as a center, a plurality of auxiliary regions may be obtained, and the plurality of auxiliary regions are in different shapes.

For example, if a size factor is 32×32, and the aspect ratio factors include: 1:2, 1:1, and 2:1, three auxiliary regions may be determined with an anchor region as a center: an auxiliary region 1 of 16×64, an auxiliary region 2 of 32×32, and an auxiliary region 3 of 64×16. For each pixel in the feature map, a corresponding auxiliary region may be determined. If there are n pixels in a feature map A and there are m aspect ratios, n×m auxiliary regions may be determined according to the feature map A.

Similarly, each auxiliary region may be mapped back to a convolved feature information block in the regional convolved feature information. The convolved feature information block may be referred to as unit regional convolved feature information.

As described above, the unit regional convolved feature information is determined based on mapping to the target image from the first convolved feature information, and then based on mapping to the first convolved feature information from the target image. In an actual operation process, a plurality of pieces of unit regional convolved feature information may be directly determined in the first convolved feature information based on the aspect ratio, the size factors, and the proportional relationship between the target image and the first convolved feature information.

A pooling operation is performed on the plurality of pieces of unit regional convolved feature information based on the pooling layer in the target RPN to obtain pooled feature information (all referred to as first pooled feature information, for example, the pooled feature information 20c and the pooled feature information 20d shown in the foregoing embodiment corresponding to FIG. 2A). Data sizes and quantities of data channels of all the first pooled feature information are the same. The data size of the first pooled feature information may be 7×7, and the quantity of data channels is 256. When the data size of the first pooled feature information is p×p, the pooling operation refers to dividing the unit regional convolved feature information into data blocks of p×p, and calculating a maximum value (that is, performing max pooling) in each data block as a representation of the data block or calculating an average value (that is, performing average pooling) in each data block as a representation of the data block.

Matching probabilities between each piece of first pooled feature information and a text background category and between each piece of first pooled feature information and a text category are recognized based on the classifier in the target RPN. The probability between the each piece of first pooled feature information and the text category is referred to as a foreground factor, and the probability between the each piece of first pooled feature information and the text background category is referred to as a background factor. In certain embodiments, the background factor plus the foreground factor is equal to 1. The foreground factor (or the background factor) may be understood as a probability that a region corresponding to the first pooled feature information in the target image includes a text object (or a non-text object). A larger foreground factor indicates a higher probability that the region corresponding to the first pooled feature information in the target image includes a text object.

A region offset factor of each piece of first pooled feature information is recognized based on the regressor in the target RPN. The region offset factor herein is an offset factor of a region corresponding to the first pooled feature information in the target image and may include: dx (representing an offset of a horizontal coordinate of a region center), dy (representing an offset of a vertical coordinate of the region center), dh (representing a height offset of the region), and dw (representing a width offset of the region).

The terminal device obtains a factor threshold and uses first pooled feature information with a foreground factor greater than the factor threshold as to-be-determined pooled feature information. The to-be-determined pooled feature information is projected onto the target image according to the size factor corresponding to the first size and a region offset factor of the to-be-determined pooled feature information. A determined region in the target image is referred to as a first ROI (for example, the region 20e and the region 20f in the foregoing embodiment corresponding to FIG. 2A).

The first ROI may be determined by using the following formula (1):

$$dx = (x - xa)/wa, \; dy = (y - ya)/ha \quad (1)$$
$$dw = \log(w/wa), \; dh = \log(h/ha)$$

where dx, dy, dh, and dw represent region offset factors, x, Y, h, and w represent a horizontal coordinate of a center of the first ROI, a vertical coordinate of the center of the first ROI, a height of the first ROI, and a width of the first ROI respectively, and xa, ya, ha, and wa represent a horizontal coordinate of a center of a region corresponding to the first pooled feature information in the target image (which may be understood as an image region determined in the target image according to the size factor and the first pooled feature information before adjustment based on the region offset factors), a vertical coordinate of the center of the region, a height of the region, and a width of the region respectively.

Similarly, convolution may be performed on the second convolved feature information based on the convolutional layer in the target RPN to obtain regional convolved feature information of the second convolved feature information. A plurality of pieces of unit regional convolved feature information corresponding to the second convolved feature information are determined in the regional convolved feature information according to a size factor of the second size and an aspect ratio. A pooling operation is performed on the plurality of pieces of unit regional convolved feature information corresponding to the second convolved feature information based on the pooling layer in the target RPN, to obtain a plurality of pieces of second pooled feature information respectively (data sizes and quantities of data channels of the second pooled feature information and the first pooled feature information are the same). Similarly, a foreground factor and a region offset factor of each piece of second pooled feature information are determined according to the classifier and the regressor in the target RPN. Similarly, second pooled feature information with a foreground factor greater than the factor threshold is selected from the plurality of pieces of second pooled feature information. The selected second pooled feature information is mapped onto the target image according to a region offset factor of the selected second pooled feature information, the size factor of the second size, and the formula (1). A determined region in the target image is referred to as a second ROI.

The first ROI and the second ROI determined in the foregoing manner are image regions having different sizes and different aspect ratios. In this way, it can be ensured that there is always one or more ROIs that may include the text object regardless of whether the text object in the target image is arranged horizontally, vertically, or obliquely.

The terminal device may determine both the first ROI and the second ROI, and combine all ROIs into an ROI set.

Although foreground factors of the ROIs in the ROI set are all greater than the factor threshold, there may be an overlap between ROIs. Therefore, a region proposal may need to be further selected from the ROI set based on NMS. A specific process of selecting a region proposal based on NMS is as follows: determining a foreground factor of each ROI in the ROI set, selecting an ROI having the largest foreground factor as a polling ROI, determining an overlapping area between each ROI in the ROI set and the polling ROI, and combining ROIs whose overlapping areas are less than an area threshold into a new ROI set. Then an ROI having the largest foreground factor is selected from the new ROI set as a new polling ROI, and an overlapping area between the new polling ROI and an ROI in the new ROI set is calculated. Similarly, ROIs whose overlapping areas are less than the area threshold are combined into an ROI set. The foregoing process is repeated until an ROI set is an empty set. In this case, all polling ROIs are used as region proposals.

For example, an ROI set includes: an ROI A (with a foreground factor of 0.9), an ROI B (with a foreground factor of 0.8), an ROI C (with a foreground factor of 0.7), and an ROI D (with a foreground factor of 0.6). The ROI A is selected from the four ROIs as a polling ROI, and overlapping areas between the ROI A and the ROI B, between the ROI A and the ROI C, and between the ROI A and the ROI D are determined respectively. The ROI C and the ROI D whose overlapping areas are less than the area threshold are further combined into an ROI set. Then the ROI C is selected as a polling ROI. If an overlapping area between the ROI C and the ROI D is greater than the area threshold, an ROI set in this case is an empty set. Therefore, the ROI A and the ROI C are region proposals.

The region proposal selected from the ROI set based on NMS includes the text object, and the text object is at a center of the region proposal. Regardless of any direction in which the text object is arranged in the target image, the selected region proposal includes the text object precisely. For example, when the text object is arranged in a vertical downward direction in the target text image, a height of the selected region proposal is greater than a width of the region proposal.

Step S102. Obtain region proposal feature information of the region proposal, and generate an initial mask according to the region proposal feature information.

Specifically, it can be learned from the foregoing description that each first ROI corresponds to a piece of first pooled feature information, each second ROI corresponds to a piece of second pooled feature information, and the region proposal is determined from the first ROIs and the second ROIs. Therefore, in the first pooled feature information and the second pooled feature information, the terminal device uses pooled feature information corresponding to the region proposal as region proposal feature information, that is, the region proposal feature information is the pooled feature information of the region proposal. Accordingly, it can be learned that each region proposal corresponds to a piece of region proposal feature information. A mask is used for covering a to-be-processed image (wholly or partially) to control an image processing region or a selected image, graphic, or object used during processing.

The terminal device obtains a text detection network and a keyword detection network, inputs the region proposal feature information into the text detection network, to obtain a text background mask and a text content mask. The terminal device inputs the region proposal feature information into the keyword detection network, to obtain a keyword background mask and a plurality of keyword category masks. The terminal device may determine the text background mask, the text content mask, the keyword background mask, and the plurality of keyword category masks as initial masks.

A text object attribute of each pixel (referred to as a target pixel) in the target image may be determined according to the text background mask. The text object attribute includes a text attribute and a non-text attribute. The text object attribute may indicate whether the target pixel is a pixel at which the text object is located. For example, if a text object attribute of a target pixel A is a text attribute, the target pixel A is a pixel at which the text object is located. If the text object attribute of the target pixel A is a non-text attribute, the target pixel A is not a pixel at which the text object is located.

A keyword object attribute of each target pixel in the target image may be determined according to the keyword background mask. The keyword object attribute includes a keyword attribute and a non-keyword attribute. The keyword object attribute may indicate whether the target pixel is a pixel at which a keyword is located. For example, if a keyword object attribute of the target pixel A is a keyword attribute, the target pixel A is a pixel at which a keyword in the text object is located. If the keyword object attribute of the target pixel A is a non-keyword attribute, the target pixel A is not a pixel at which the keyword is located. The text object attribute and the keyword object attribute are object attributes.

The recognition of the text object attribute and the keyword object attribute of each target pixel belongs to image semantic segmentation. In short, there are two image semantic segmentation branches (that is, the text detection network and the keyword detection network), one image semantic segmentation branch is configured to determine the text object attribute of the each target pixel, and the other image semantic segmentation branch is configured to determine the keyword object attribute of the each target pixel. Through the two branches, it can be determined whether the each target pixel has a text attribute or a non-text attribute as well as a keyword attribute or a non-keyword attribute. The two branches may be totally independent of each other but share the region proposal feature information. Therefore, each target pixel has two attributes.

Step S103. Restore the initial mask to a target binary mask, determine a mask connection region in the target binary mask, and determine a text image region associated with the text object in the target image according to the mask connection region.

Specifically, the terminal device restores the initial mask to a target binary mask having the same size as the target image, a value of the target binary mask including only two values: a first value and a second value. The first value may be a value of 0, and the second value may be a value of 1.

The terminal device determines a connection region from the target binary mask as a mask connection region. Values of probability matrix elements included in the connection region are the same, a quantity of probability matrix elements included in the connection region is greater than a quantity threshold, and the target binary mask includes a plurality of probability matrix elements.

The terminal device determines location information of the mask connection region in the target binary mask, and uses an image region corresponding to the location information as a text image region (for example, the image region 20$p$ and the image region 20$q$ in the foregoing embodiment corresponding to FIG. 2A) associated with the text object in the target image.

From the perspective of the object attribute of the target pixel, a process of determining a text image region is as follows: The terminal device selects, from all the target pixels, target pixels that may be combined into a connection region in which text object attributes of all target pixels are text attributes, as to-be-combined target pixels. The connection region refers to a region in which a quantity of target pixels included is greater than the quantity threshold. In the target image, a region corresponding to a minimum rectangle including the to-be-combined target pixels is used as a text region in which the text object is located in the target image.

The terminal device selects, from all the target pixels, target pixels that may be combined into a connection region in which keyword object attributes of all target pixels are keyword attributes, as to-be-combined target pixels. The connection region refers to a region in which a quantity of target pixels included is greater than the quantity threshold. In the target image, a region corresponding to a minimum rectangle including the to-be-combined target pixels is used as a keyword region in which a keyword is located in the text object in the target image. The terminal device uses the determined text region and the keyword region as text image regions.

Figure 5:
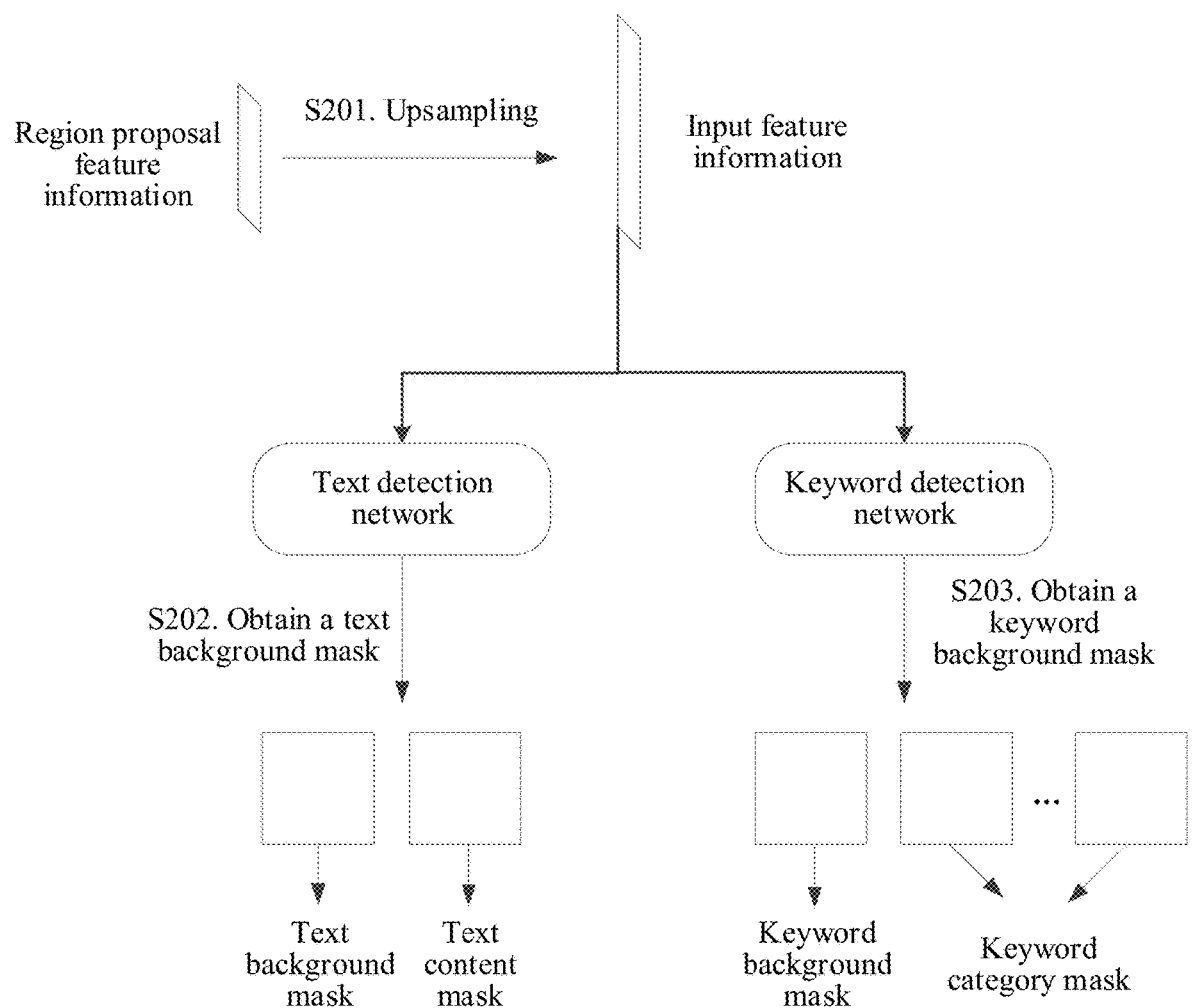
FIG. 5 is a schematic diagram of generating an initial mask according to one or more embodiments of the present disclosure.

FIG. 5 is a schematic diagram of generating an initial mask according to an embodiment of the present disclosure. The generating an initial mask includes steps S201 to S203, and steps S201 to S203 belong to a specific embodiment of step S102 in the foregoing embodiment corresponding to FIG. 3.

Step S201. Obtain the region proposal feature information of the region proposal, and perform upsampling on the region proposal feature information to obtain input feature information.

Specifically, the terminal device obtains the region proposal feature information of the region proposal. For a specific process of obtaining the region proposal feature information, reference may be made to steps S101 and S102 in the foregoing embodiment corresponding to FIG. 3.

The terminal device performs upsampling on the region proposal feature information to expand a data size of the region proposal feature information. Feature information obtained after the upsampling may be referred to as input feature information. For example, region proposal feature information of 7×7×256 may be upsampled to obtain input feature information of 14×14×256. The upsampling may be performed in a manner of deconvolution or interpolation.

Step S202. Perform convolution on the input feature information based on a convolutional layer in the text detection network to obtain the text background mask.

Specifically, the terminal device obtains the text detection network. The text detection network may correspond to the image semantic segmentation branch that determines the text object attribute of each target pixel. Based on the convolutional layer in the text detection network, convolution is performed on the input feature information. The convolutional layer in the text detection network may include four convolutional layers and one deconvolutional layer. After a convolution operation and a deconvolution operation, a text mask of 28×28×2 is generated. The text mask includes a text background mask of a data size of 28×28 belonging to the text background category, and a text content mask of a data size of 28×28 belonging to the text category.

Step S203. Perform convolution on the input feature information based on a convolutional layer in the keyword detection network to obtain the keyword background mask.

Specifically, the terminal device obtains the keyword detection network. The keyword detection network may correspond to the image semantic segmentation branch that determines the keyword object attribute of each target pixel.

Based on the convolutional layer in the keyword detection network, convolution is performed on the input feature information. The convolutional layer in the keyword detection network may include four convolutional layers and one deconvolutional layer. After the convolution, a keyword mask with a data size of 28×28×(K+1) is generated. The keyword mask includes a keyword background mask of a data size of 28×28 belonging to a keyword background category, and K keyword category masks of data sizes of 28×28 corresponding to K preselected keywords respectively.

For example, the preselected keywords include: "mobile phone", "hotel", and "Dictionary", then a keyword mask of 28×28×4 is generated. The keyword mask includes a keyword background mask belonging to the keyword background category, and a keyword category mask corresponding to the preselected keywords "mobile phone", a keyword category mask corresponding to the preselected keyword "hotel", and a keyword category mask corresponding to the preselected keyword "Dictionary".

The terminal device may determine the text background mask, text content mask, keyword background mask, and the plurality of keyword category masks as initial masks.

The foregoing relationship may be concluded as follows: The initial mask includes the text mask and the keyword mask, the text mask further includes the text background mask and the text content mask, and the keyword mask further includes the keyword background mask and the keyword category mask. The text background mask may be used for determining a text region, and the keyword background mask may be used for determining a keyword region.

Figure 6:
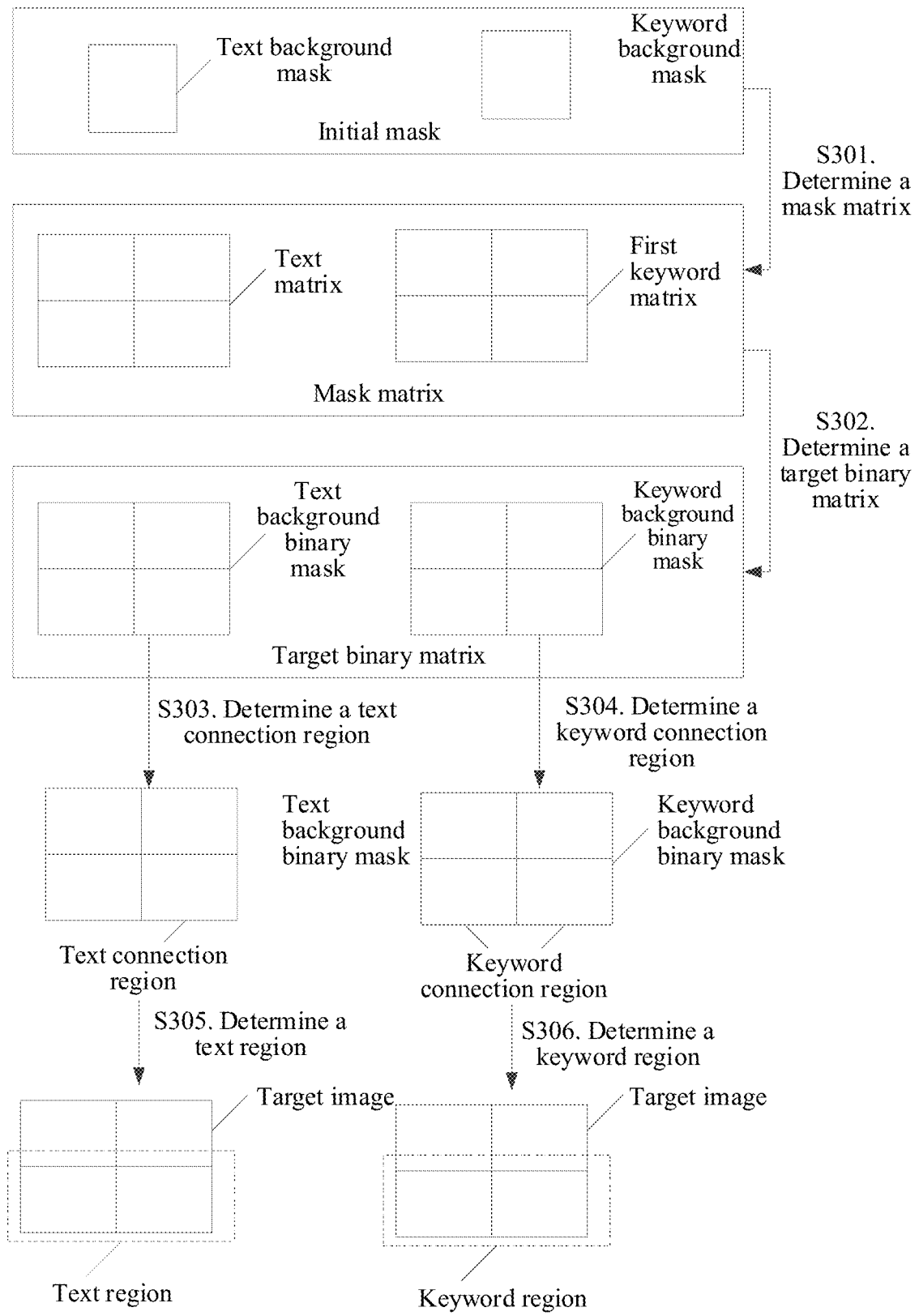
FIG. 6 is a schematic diagram of determining a text image region according to one or more embodiments of the present disclosure.

FIG. 6 is a schematic diagram of determining a text image region according to an embodiment of the present disclosure. The determining a text image region includes steps S301 to S306, and steps S301 to S306 belong to a specific embodiment of step S103 in the foregoing embodiment corresponding to FIG. 3.

Step S301. Perform interpolation on the initial mask to obtain a mask matrix having the same size as the target image.

Specifically, the terminal device performs interpolation on the text background mask in the initial mask to obtain a text matrix, and performs interpolation on the keyword background mask in the initial mask to obtain a first keyword matrix. A size of the text matrix is equal to a size of the first keyword matrix as well as a size of the target image.

The terminal device may determine the text matrix and the first keyword matrix as mask matrices.

A value of any probability matrix element in the text matrix represents a probability that a corresponding target pixel has a non-text attribute (that is, it is not a text). If interpolation is performed on a text content mask belonging to the text category to obtain a matrix having the same size as the target image, a value of any probability matrix element in the matrix represents a probability that a corresponding target pixel has a text attribute.

A value of any probability matrix element in the first keyword matrix represents a probability that a corresponding target pixel has a non-keyword attribute. If interpolation is performed on a keyword category mask corresponding to a preselected keyword A to obtain a matrix having the same size as the target image, a value of any probability matrix element in the matrix represents a probability that a corresponding target pixel belongs to the preselected keyword A.

Step S302. Adjust a value of a probability matrix element in the mask matrix less than or equal to a preset mask threshold to a first value, and adjust a value of a probability matrix element in the mask matrix greater than the preset mask threshold to a second value, to obtain the target binary mask.

Specifically, when the mask matrix is the text matrix, the terminal device may set a value of a probability matrix element in the text matrix less than or equal to the preset mask threshold to the first value (for example, a value of 0), and set a value of a probability matrix element in the text matrix greater than the preset mask threshold to the second value (for example, a value of 1), to obtain a matrix, referred to as a text background binary mask, that is, there are only values of 0 or 1 in the text background binary mask.

When the mask matrix is the first keyword matrix, the terminal device may set a value of a probability matrix element less than or equal to the preset mask threshold in the first keyword matrix to the first value (for example, a value of 0), and set a value of a probability matrix element greater than the preset mask threshold in the first keyword matrix to the second value (for example, a value of 1), to obtain a matrix, referred to as a keyword background binary mask, that is, there are only values of 0 or 1 in the keyword background binary mask.

The terminal device may determine the text background binary mask and the keyword background binary mask as target binary masks.

Figure 7:
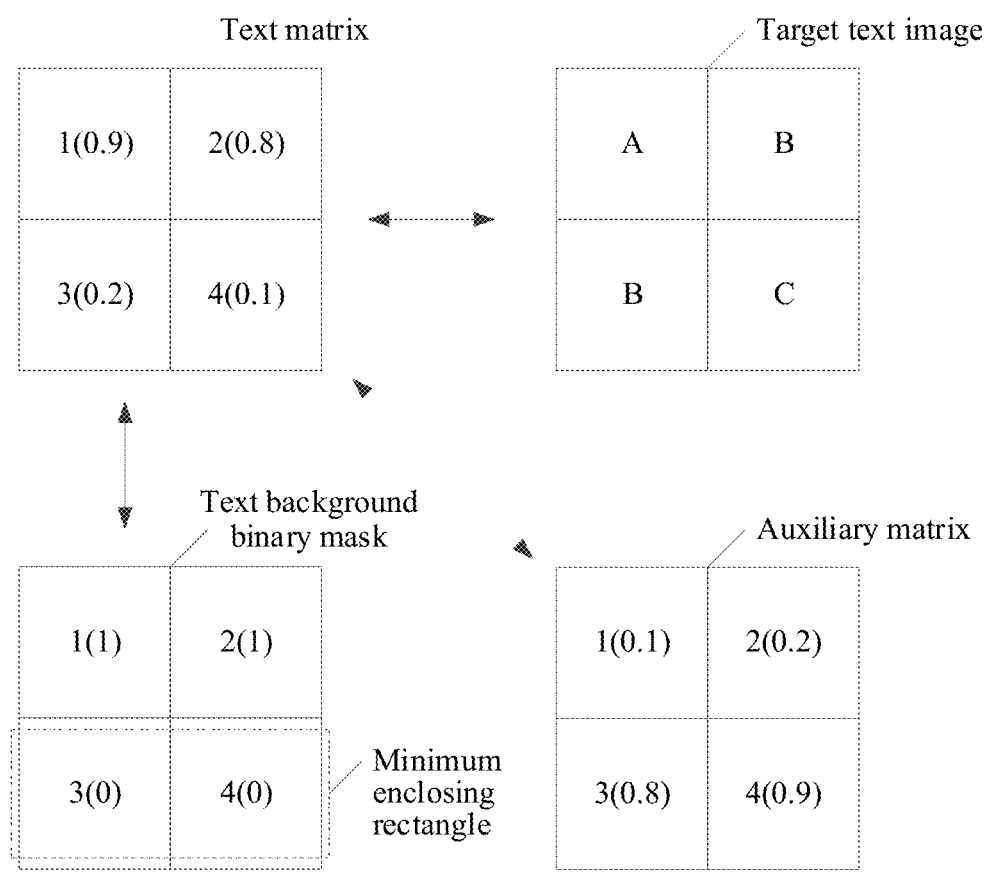
FIG. 7 is a schematic diagram of determining a text background binary mask according to one or more embodiments of the present disclosure.

For example, FIG. 7 is a schematic diagram of determining a text background binary mask according to an embodiment of the present disclosure. A probability matrix element 1, a probability matrix element 2, a probability matrix element 3, and a probability matrix element 4 in the text matrix correspond to a target pixel A, a target pixel B, a target pixel C, and a target pixel D in the target image respectively. The preset mask threshold is equal to 0.5. The terminal device may set values corresponding to the probability matrix element 3 and the probability matrix element 4 less than 0.5 to a value of 0, and set values corresponding to the probability matrix element 1 and the probability matrix element 2 greater than 0.5 to a value of 1, to obtain a text background binary mask.

From the perspective of the object attribute of the target pixel, the determining a target binary mask is: using a text object attribute of a target pixel corresponding to the probability matrix element whose value is less than or equal to the preset mask threshold in the text matrix as a text attribute, and correspondingly, using a text object attribute of a target pixel corresponding to the probability matrix element whose value is greater than the preset mask threshold in the text matrix as a non-text attribute. The text matrix is determined by using the text background mask, so that it can be further determined that each target pixel in the target image has either the text attribute or the non-text attribute.

The terminal device uses a keyword object attribute of the target pixel corresponding to the probability matrix element whose value is less than or equal to the preset mask threshold in the first keyword matrix as a keyword attribute, and correspondingly, the terminal device uses a keyword object attribute of the target pixel corresponding to the probability matrix element whose value is greater than the preset mask threshold in the first keyword matrix as a non-keyword attribute. The first keyword matrix is determined by using the keyword background mask, so that it can be further determined that each target pixel in the target image has either the keyword attribute or the non-keyword attribute. According to the keyword background mask, it can be determined only whether the target pixel is a pixel of a keyword, but a specific preselected keyword cannot be determined.

Step S303. Determine a connection region including probability matrix elements of the first value in the text background binary mask, as the text connection region.

Specifically, in the text background binary mask, the connection region including the probability matrix elements having the first value is used as the text connection region. The connection region refers to a region in which values of all probability matrix elements in the region are the same, and a quantity of probability matrix elements included is greater than a quantity threshold.

From the perspective of the attribute of the target pixel, the text object attributes of the target pixels corresponding to the text connection region are all text attributes.

Step S304. Determine a connection region including probability matrix elements of the first value in the keyword background binary mask, as the keyword connection region.

Specifically, in the keyword background binary mask, the terminal device uses the connection region including the probability matrix elements having the first value as the keyword connection region. The connection region refers to a region in which values of all probability matrix elements in the region are the same, and a quantity of probability matrix elements included is greater than the quantity threshold.

From the perspective of the attribute of the target pixel, the keyword object attributes of the target pixels corresponding to the keyword connection region are all keyword attributes.

The terminal device may determine the text connection region and the keyword connection region as mask connection regions.

Step S305. Obtain first location information of a minimum rectangle including the text connection region in the text background binary mask, and use an image region corresponding to the first location information in the target image as the text region.

Specifically, the minimum rectangle including the text connection region is obtained, and the location information (referred to as the first location information) of the minimum rectangle in the text background binary mask is determined. The first location information may include: a horizontal coordinate and a vertical coordinate of a center of the minimum rectangle in the text background binary mask, a height of the minimum rectangle, and a width of the minimum rectangle.

The terminal device uses an image region corresponding to the first location information in the target image as a text region (for example, the image region 20*p* in the foregoing embodiment corresponding to FIG. 2A) in which the text object is located in the target image. The text region may be marked on the target image in the form of a rectangle.

In certain embodiments, interpolation is performed on the text content mask of the data size of 28×28 belonging to the text content category to obtain an auxiliary matrix. The auxiliary matrix has the same size as the text matrix, the text background binary mask, and the target image. The determined text connection region in the text background binary mask is obtained, auxiliary submatrices corresponding to the text connection region are determined in the auxiliary matrix, and an average value of the submatrices is calculated as a confidence level of the text region. The confidence level of the text region may be labeled in the text region in the target image.

The foregoing process may be concluded as follows: In the text masks, a text background mask belonging to the background is used for determining the text region in which the text object is located, and a text content mask belonging to the text is used for determining the confidence level of the text region.

The example in FIG. 7 is still used for description. The preset mask threshold is 0.5, then the text background binary mask may be determined according to the text matrix. The text connection region in the text background binary mask includes: the probability matrix element 3 and the probability matrix element 4. In the text background binary mask, location information of a minimum rectangle (that is, the minimum enclosing rectangle in FIG. 7) including the probability matrix element 3 and the probability matrix element 4 is first location information. A region corresponding to the first location information in the target image is a text region. The text region may be marked on the target image in the form of a rectangle.

The terminal device obtains the text content mask of the data size of 28×28 belonging to the text category and performs interpolation to obtain an auxiliary matrix (for example, the auxiliary matrix in FIG. 7). It can be learned that, a sum of values of an auxiliary matrix and a text matrix in the same probability matrix element is equal to 1. The text connection region is the probability matrix element 3 and the probability matrix element 4, and therefore, the auxiliary submatrix includes the probability matrix element 3 and the probability matrix element 4. An average value of the probability matrix element 3 and the probability matrix element 4 is calculated: (0.8+0.9)/2=0.85 then a confidence level of the text region is 0.85.

Subsequently, in different service scenarios, a text region that satisfies a service requirement may be further selected according to confidence levels of text regions.

Step S306. Obtain second location information of a minimum rectangle including the keyword connection region in the keyword background binary mask, and use an image region corresponding to the second location information in the target image as the keyword region.

Specifically, the terminal device obtains the minimum rectangle including the keyword connection region, and determines the location information (referred to as the second location information) of the minimum rectangle in the keyword background binary mask. The second location information may include: a horizontal coordinate and a vertical coordinate of a center of the minimum rectangle in the keyword background binary mask, a height of the minimum rectangle, and a width of the minimum rectangle.

The terminal device uses an image region corresponding to the second location information in the target image as a keyword region (for example, the image region 20*q* in the foregoing embodiment corresponding to FIG. 2A) in which a keyword in the text object is located in the target image. The keyword region may be marked on the target image in the form of a rectangle.

The terminal device may determine the text region and the keyword region as text image regions associated with the text object.

On the target image, rectangles used for marking the text region and the keyword region may be rectangles in different colors or rectangles with lines of different thicknesses or may be a solid-line rectangle and a dashed-line rectangle. In this way, the rectangle of the text region and the rectangle of the keyword region can be distinguished in the target image.

In certain embodiments, interpolation is performed on a plurality of keyword category masks of the data size of 28×28 corresponding to the plurality of preselected keywords to obtain second keyword matrices respectively. The second keyword matrix has the same size as the first keyword matrix, the keyword background binary mask, and the target image. Descriptions are made below by using one second keyword matrix as an example.

The keyword connection region determined in the keyword background binary mask is obtained, second keyword submatrices corresponding to the keyword connection region are determined in the second keyword matrix, and an average value of the second keyword submatrices is calculated as a confidence level of the keyword category mask corresponding to the second keyword matrix. Each of the second keyword matrices may be processed in this manner, to determine a confidence level corresponding to each of the second keyword matrices. It can be learned that a quantity of confidence levels is equal to a quantity of keyword category masks included in the keyword mask. The terminal device uses, according to confidence levels corresponding to the keyword category masks, a preselected keyword corresponding to a keyword category mask having the largest confidence level as a target keyword included in the keyword region. The target keyword and a corresponding confidence level (that is, the largest confidence level) may be labeled in the target image. For example, the target keyword and the corresponding confidence level may be displayed around the keyword region in the target image.

The foregoing process may be concluded as follows: In the keyword masks, a keyword background mask belonging to the background is used for determining a keyword region in which a keyword is located, and the keyword category masks corresponding to the plurality of preselected keywords respectively are used for determining which keyword is specifically included in the keyword region and determining a confidence level.

Figure 8:
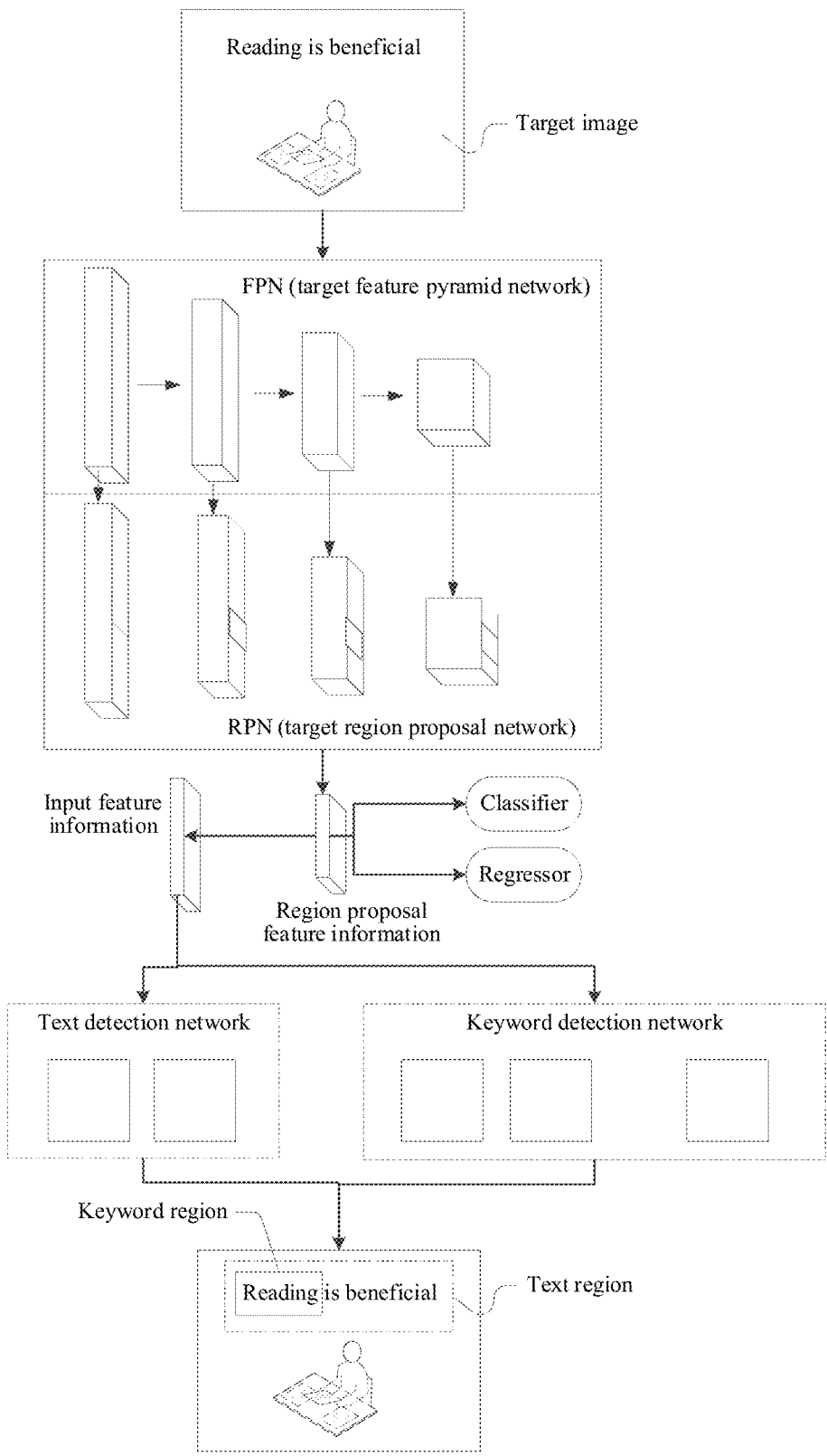
FIG. 8 is a schematic structural diagram of image processing according to one or more embodiments of the present disclosure.

FIG. 8 is a schematic structural diagram of image processing according to an embodiment of the present disclosure. The schematic structural diagram in the present disclosure mainly includes two main parts, one is extracting, based on a target FPN and a target RPN, a region proposal in which a text object is located, and the other is predicting in parallel a text region and a keyword region based on two instance segmentation branches (a text detection network and a keyword detection network) of image semantic segmentation.

A specific execution process is as follows: After obtaining a target image, a terminal device inputs the target image including a text object (that is, reading is beneficial) that includes a keyword (that is, reading) into the target FPN, to extract convolved feature information of different sizes. The terminal device then inputs the convolved feature information of different sizes into the target RPN to extract unit regional convolved feature information of different sizes respectively, performs pooling on all the unit regional convolved feature information to obtain pooled feature information (that is, the first pooled feature information and the second pooled feature information), recognizes a foreground factor and a region offset factor of each piece of pooled feature information based on a classifier in the RPN, and projects pooled feature information with a foreground factor greater than a factor threshold onto the target image according to a corresponding region offset factor, and determines an ROI (that is, the first ROI and the second ROI) in the target image. The terminal device selects a region proposal from a plurality of ROIs by using NMS, and uses pooled feature information corresponding to the region proposal as region proposal feature information.

The region proposal feature information is upsampled to obtain input feature information. The input feature information is inputted into the text detection network to output a text mask, and inputted into the keyword detection network to output a keyword mask. A text region (the text region is marked with a dashed-line rectangle in FIG. 8) of the text object in the target image may be determined according to a text background mask in the text mask, and a keyword region (the keyword region is marked with a solid-line rectangle in FIG. 8) of the keyword in the text object in the target image may be determined according to a keyword background mask in the keyword mask.

In certain embodiments, the text region and the keyword region that are determined in parallel based on two independent detection networks may alternatively be determined in a serial manner. The keyword region is likely in the text region. Therefore, the terminal device may alternatively first determine only the text region in the foregoing manner, and after the text region is determined, the terminal device clips the text region out of the target image to obtain a target subimage, that is, the target subimage includes only the text object, and there is less interfering information in the target subimage. Subsequently, the terminal device may input the target subimage into a trained keyword detection model, and the keyword detection model may recognize a reference region in which a keyword in the target subimage is located. The terminal device then maps the recognized reference region onto the target image, so as to determine a keyword region in which the keyword in the target image is located.

In certain embodiments, in addition to the text region and the keyword region in the target image, a hyperlink region in the target image can be determined. That is, an initial mask further includes a hyperlink mask (a hyperlink detection network may be added to generate the hyperlink mask). The hyperlink mask includes a hyperlink background mask and a hyperlink content mask. Similarly, the terminal device restores the hyperlink background mask to a hyperlink background binary mask having the same size as the target image. A hyperlink connection region is determined according to the hyperlink background binary mask, and a hyperlink region in which a hyperlink is located is determined in the target image. The hyperlink content mask may be used for determining a confidence level of the hyperlink region.

Figure 9:
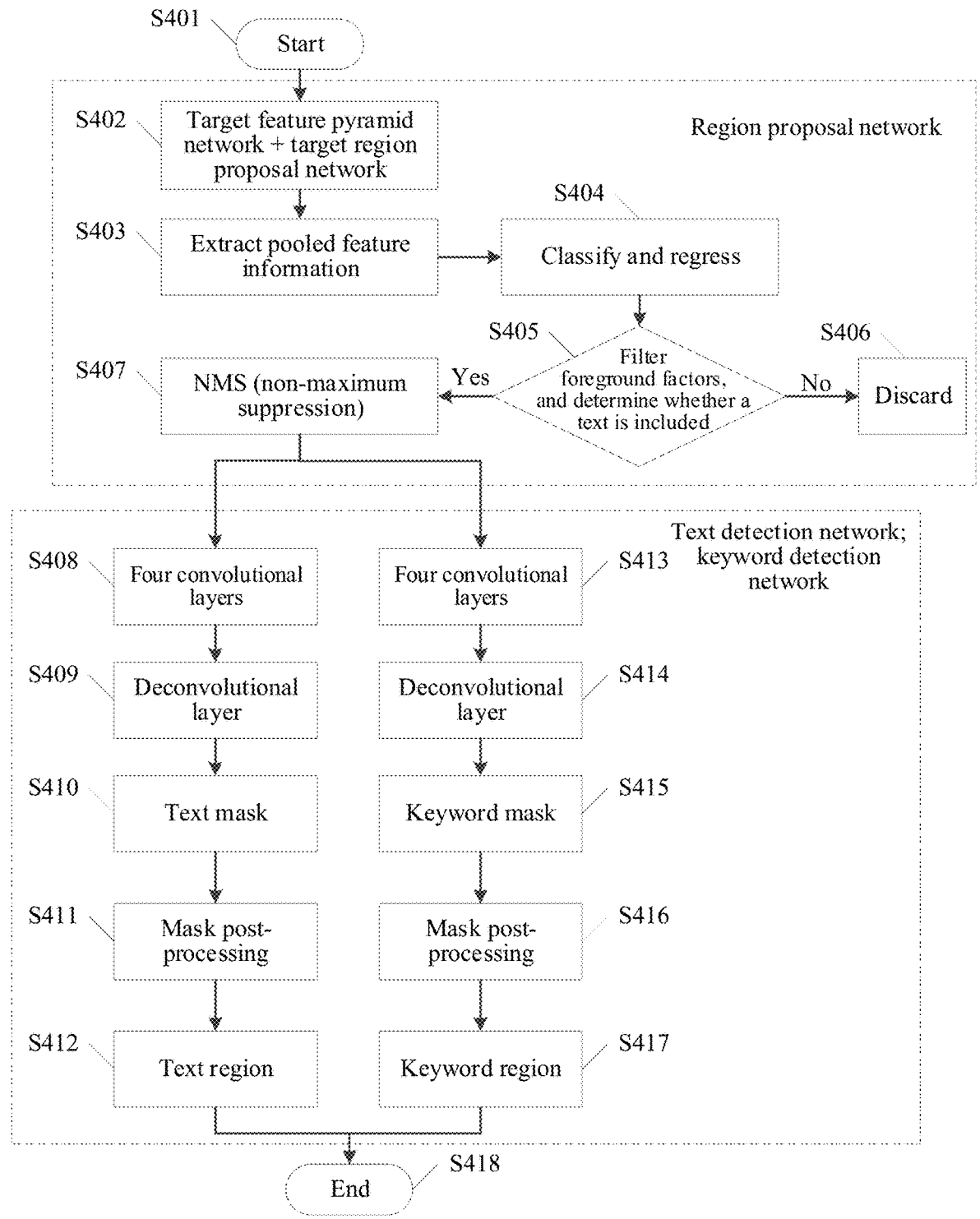
FIG. 9 is a schematic flowchart of another image processing method according to one or more embodiments of the present disclosure.
Figure 10:
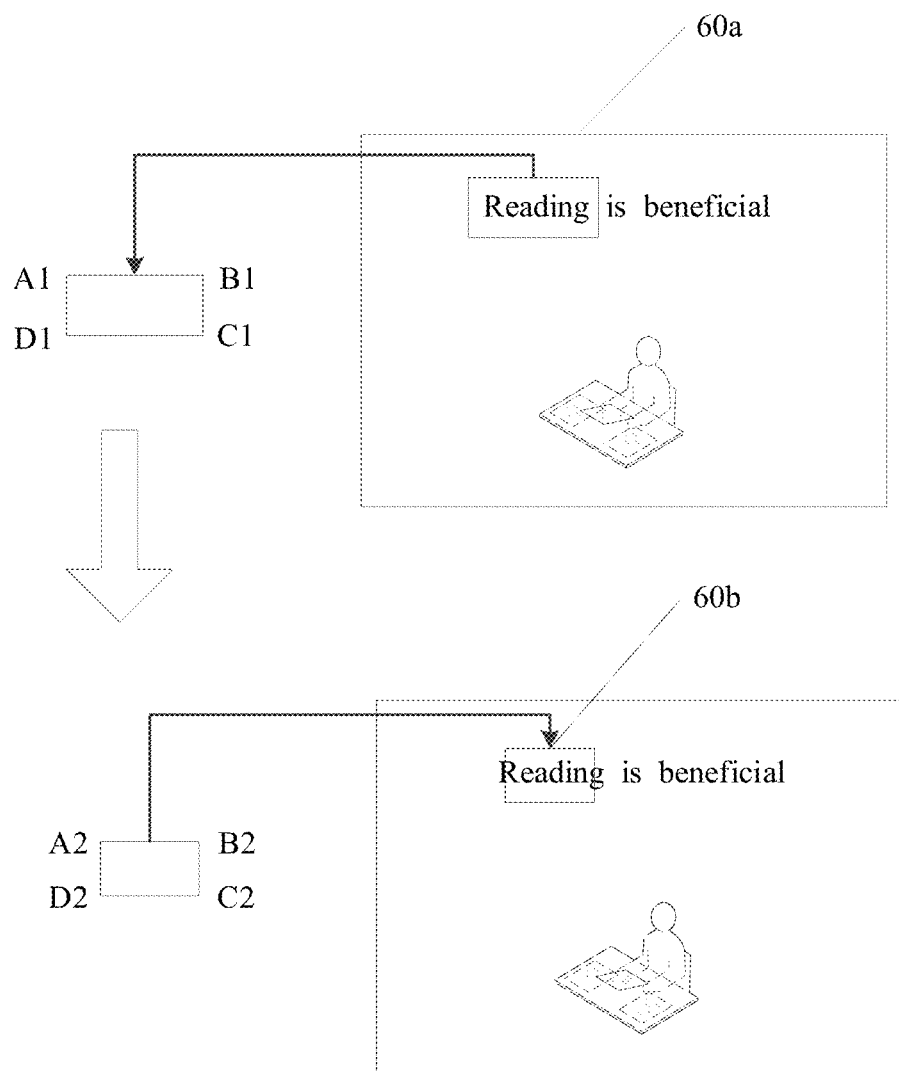
FIG. 10 is a schematic diagram of a shrinking policy according to one or more embodiments of the present disclosure.

FIG. 9 is a schematic flowchart of another image processing method according to an embodiment of the present disclosure. The image processing method includes steps S401 to S418.

Step S401. A procedure starts.

Step S402. Determine a plurality of pieces of unit regional convolved feature information based on convolutional layers in a target FPN and a target RPN.

Step S403. Perform pooling on the plurality of pieces of unit regional convolved feature information respectively based on a pooling layer in the target RPN to extract a plurality of pieces of pooled feature information.

Step S404. Determine a foreground factor and a region offset factor of each piece of pooled feature information based on a classifier and a regressor in the target RPN.

For specific processes of extracting the plurality of pieces of unit regional convolved feature information, determining pooled feature information of each piece of unit regional convolved feature information, and determining a foreground factor and a region offset factor of each piece of pooled feature information, reference may be made to step S101 in the foregoing embodiment corresponding to FIG. 3.

Step S405. Determine whether the foreground factor is greater than a factor threshold.

Specifically, whether a foreground factor of each piece of pooled feature information is greater than the factor threshold is determined separately. If no, step S406 is performed. If yes, steps S407 to S418 are performed.

Step S406. Discard pooled feature information with a foreground factor less than or equal to the factor threshold.

Step S407. Map pooled feature information with a foreground factor greater than the factor threshold onto the target image to obtain an ROI, determine a region proposal from a plurality of ROIs by using NMS, and use pooled feature information of the region proposal as region proposal feature information.

For a specific process of determining a region proposal by using NMS, reference may be made to step S101 in the foregoing embodiment corresponding to FIG. 3.

Step S408. A convolutional layer in a text detection network performs convolution on the region proposal feature information.

Step S409. A deconvolutional layer in the text detection network performs deconvolution on the region proposal feature information.

Step S410. Output a text mask from the text detection network.

Step S411. Perform mask post-processing on a text background mask and a text content mask in the text mask.

Step S412. Output a text region and a confidence level of the text region.

For specific processes of determining the text mask based on the text detection network and determining the text region and the confidence level of the text region according to the text mask, reference may be made to steps S301 to S303 and step S305 in the foregoing embodiment corresponding to FIG. 6.

Step S413. A convolutional layer in a keyword detection network performs convolution on the region proposal feature information.

Step S414. A deconvolutional layer in the keyword detection network performs deconvolution on the region proposal feature information.

Step S415. Output a keyword mask from the keyword detection network.

Step S416. Perform mask post-processing on a keyword background mask and a keyword category mask in the keyword mask.

Step S417. Output a keyword region, a target keyword in the keyword region, and a confidence level of the target keyword.

For specific processes of determining the keyword mask based on the keyword detection network and determining the keyword region, the target keyword, and the confidence level of the target keyword according to the keyword mask, reference may be made to steps S301, S302, S304, and S306 in the foregoing embodiment corresponding to FIG. 6.

Step S418. The procedure ends.

In certain embodiments, a process of training network models involved in the foregoing image processing method is described in the following. The terminal device obtains a text image sample for network training, the text image sample including a text object (referred to as a sample text object), the sample text object including a preselected sample keyword. The preselected sample keyword includes one or more of the K preselected keywords.

Similar to a process of using the networks, first, based on a sample FPN and a sample RPN, a region proposal (referred to as a sample region proposal) of the sample text object in the text image sample is determined, and sample region proposal feature information of the sample region proposal is determined.

A first predicted region of the sample text object in the text image sample is recognized based on a sample text detection network and the sample region proposal feature information. A second predicted region of the preselected sample keyword in the sample text object in the text image sample is recognized based on a sample keyword detection network and the sample region proposal feature information, and a keyword (referred to as a predicted sample keyword) in the second predicted region is predicted. The terminal device may determine the first predicted region and the second predicted region as predicted regions.

The terminal device obtains a real region (referred to as a first sample region, which may be rectangular) of the sample text object in the text image sample, and obtains a real region (referred to as a second sample region, which may also be rectangular) of the preselected sample keyword in the sample text object in the text image sample. The terminal device may determine the first sample region and the second sample region as sample regions.

The terminal device determines a first prediction error between the first predicted region and the first sample region, and adjusts a model parameter in the sample FPN, a model parameter in the sample RPN, and a model parameter in the sample text detection network according to the first prediction error through back propagation. The terminal device determines a second prediction error between the second predicted region and the second sample region, and adjusts the model parameter in the sample FPN, the model parameter in the sample RPN, and a model parameter in the sample keyword detection network according to the second prediction error through back propagation. The terminal device determines a third prediction error according to a formula (2), the predicted sample keyword, and the preselected sample keyword:

$$L = -\frac{1}{N}\sum_{n=1}^{N}\sum_{k=1}^{K}Y_{n,k}\log\left(\frac{e^{X_{n,k}}}{\sum_{j=0}^{K-1}e^{X_{n,k}}}\right) \quad (2)$$

where K is a quantity of preselected keywords, N is a quantity of pixels in the mask, Y is a keyword category mask corresponding to the predicted sample keyword, and X is a keyword category mask corresponding to the preselected sample keyword.

The model parameter in the sample FPN, the model parameter in the sample RPN, and the model parameter in the sample keyword detection network are adjusted according to the third prediction error through back propagation.

It can be learned that the prediction error includes the first prediction error, the second prediction error, and the third prediction error.

When a quantity of adjustments reaches a threshold, or a prediction error after an adjustment is within an error range, or variations of the model parameters in the networks are less than a variation threshold, the terminal device determines the adjusted sample FPN as the target FPN, determines the adjusted sample RPN as the target RPN, determines the adjusted sample text detection network as the text detection network, and determines the adjusted sample detection network as the keyword detection network.

Descriptions about how to obtain a text image sample are made in the following. The terminal device obtains an image sample. The image sample may not include any text. The terminal device obtains the sample text object including the preselected sample keyword.

The terminal device adds the sample text object to the image sample to obtain a text image sample. Such a text image sample is an image in which real location information of the sample text object is known, real location information of the preselected sample keyword is known, and the preselected sample keyword is known, that is, the text image sample is an image that may be used for adjusting the model parameter in the sample FPN, the model parameter in the sample RPN, the model parameter in the sample text detection network, and the model parameter in the sample keyword detection network.

The terminal device obtains an auxiliary image sample. The auxiliary image sample still includes the text object (referred to as an auxiliary text object), but the auxiliary text object does not include the preselected keyword. In this case, only the first prediction error can be determined. Therefore, only the model parameter in the sample FPN, the model parameter in the sample RPN, and the model parameter in the sample text detection network are adjusted according to the first prediction error, and correspondingly, the model parameter in the sample keyword detection network is not adjusted.

The text image sample may be a composite image, and the auxiliary image sample may be a real image. The model parameters in all the networks may be adjusted in a manner in which a ratio of a quantity of composite images to a quantity of real images is 2:1.

When two keywords are adjacent, especially in keywords with a relatively small size, a problem of adhesion usually occurs. Therefore, during the training of the networks, a shrinking policy may be used for resolving the problem of adhesion. For a specific process, refer to FIG. 10, which is a schematic diagram of a shrinking policy according to an embodiment of the present disclosure. When obtaining a real region 60a of the preselected sample keyword in the sample text object in the text image sample, the terminal device first determines the obtained real region 60a as a third sample region 60a, the third sample region 60a being in the form of a rectangle. Four vertexes (A, B, C, and D) of the third sample region 60a may be expressed in a clockwise sequence as: A1 $(x_1, y_1)$, B1 $(x_2, y_2)$, C1 $(x_3, y_3)$, and D1 $(x_4, y_4)$, and the region is shrunk according to the following formula (3):

$$\theta = a\tan2(y_3 - y_1, x_3 - x_1) \quad (3)$$

$$r = \|(x_1, y_1), (x_3, y_3)\|$$

$$x'_1 = 0.5 * (1 - \text{shrink}) * r * \cos(\theta) + x_1$$

$$y'_1 = 0.5 * (1 - \text{shrink}) * r * \sin(\theta) + y_1$$

$$x'_3 = -0.5 * (1 - \text{shrink}) * r * \cos(\theta) + x_3$$

$$y'_3 = -0.5 * (1 - \text{shrink}) * r * \sin(\theta) + y_3$$

where r is a Euclidean distance between the vertex A1 $(x_1, y_1)$ and the vertex C1 $(x_3, y_3)$, shrink is a shrinkage ratio factor, shrink may be set to 0.8, a vertex A2 $(x_1', y_1')$ is a new vertex obtained based on the vertex A1 $(x_1, y_1)$ after the shrinking, and a vertex C2 $(x_3', y_3')$ is a new vertex obtained based on the vertex C1 $(x_3, y_3)$ after the shrinking. The vertex B1 $(x_2, y_2)$ and the vertex D1 $(x_4, y_4)$ may be processed in the same way to determine a new vertex B2 $(x_2', y_2')$ and vertex D2 $(x_4', y_4')$. A shrunk region determined by the vertex A2 $(x_1', y_1')$, the vertex B2 $(x_2', y_2')$, the vertex C2 $(x_3', y_3')$, and the vertex D2 $(x_4', y_4')$ in the text image sample may be used as a second sample region 60b. Subsequently, the model parameter in the sample FPN, the model parameter in the sample RPN, and the model parameter in the sample keyword detection network are adjusted based on a second prediction error between the second sample region 60b and the second predicted region.

To further describe the effect of the present disclosure in recognizing a text region and a keyword region in an image, verification is performed by using two datasets. The two datasets include a Chinese detection dataset and a multi-type network image dataset.

Experiment results of the Chinese detection dataset are shown in Table 1. Compared methods include a text box (TextBoxes++), a network trained based on a composite image, and a network trained based on a composite image and a real image. The text box method is a method in which a keyword is extracted from an overall image, the composite image is the foregoing text image sample, the real image is the foregoing auxiliary image sample, and a ratio of a quantity of composite images to a quantity of real images may be 2:1. It can be learned from Table 1 that accuracy of a keyword region predicted by using the network trained based on a composite image and a real image may reach 79.55%, which is higher than the accuracy of 67.82% of the text box method and higher than the accuracy of 70.49% of the network trained only based on a composite image.

TABLE 1

Comparison of experimental results of Chinese detection dataset

| Method | Mixing ratio | Keyword region accuracy |
|---|---|---|
| Text box (TextBoxes++) | \ | 0.6782 |
| Network trained based on a composite image | \ | 0.7049 |
| Network trained based on a composite image and a real image | 2:1 | 0.7955 |

Experiment results of the multi-type network image dataset are shown in Table 2. Compared methods include the text box (TextBoxes++), the network trained based on a composite image, and the network trained based on a composite image and a real image. A ratio of a quantity of composite images to a quantity of real images is still be 2:1. It can be learned from Table 2 that accuracy of a keyword region predicted by using the network trained based on a composite image and a real image may reach 92.12%, which is higher than the accuracy of 88.26% of the text box method and higher than the accuracy of 89.37% of the network trained only based on a composite image.

TABLE 2

Comparison of experimental results of multi-type network image dataset

| Method | Mixing ratio | Keyword region accuracy |
|---|---|---|
| Text box (TextBoxes++) | \ | 0.8826 |
| Network trained based on a composite image | \ | 0.8937 |
| Network trained based on a composite image and a real image | 2:1 | 0.9212 |

It can be learned from Table 1 and Table 2 that the accuracy of the keyword region predicted by using the present disclosure is higher than that of the text box method, indicating that the present disclosure has a more accurate effect in recognizing a keyword region in an image.

Based on the above, it can be learned that, compared with manual recognition, the automatic recognition of a location of a text and a location of a keyword in an image can improve the efficiency in recognizing the location of the text and the location of the keyword. Further, the location of the text and the location of the keyword are recognized simultaneously by using the same framework, thereby avoiding serial problems and saving computing resources. In addition, a keyword region and a target keyword are determined only in a text region proposal in the present disclosure, which can greatly reduce a search region and further improve the efficiency in determining the keyword region and the target keyword.

Figure 11:
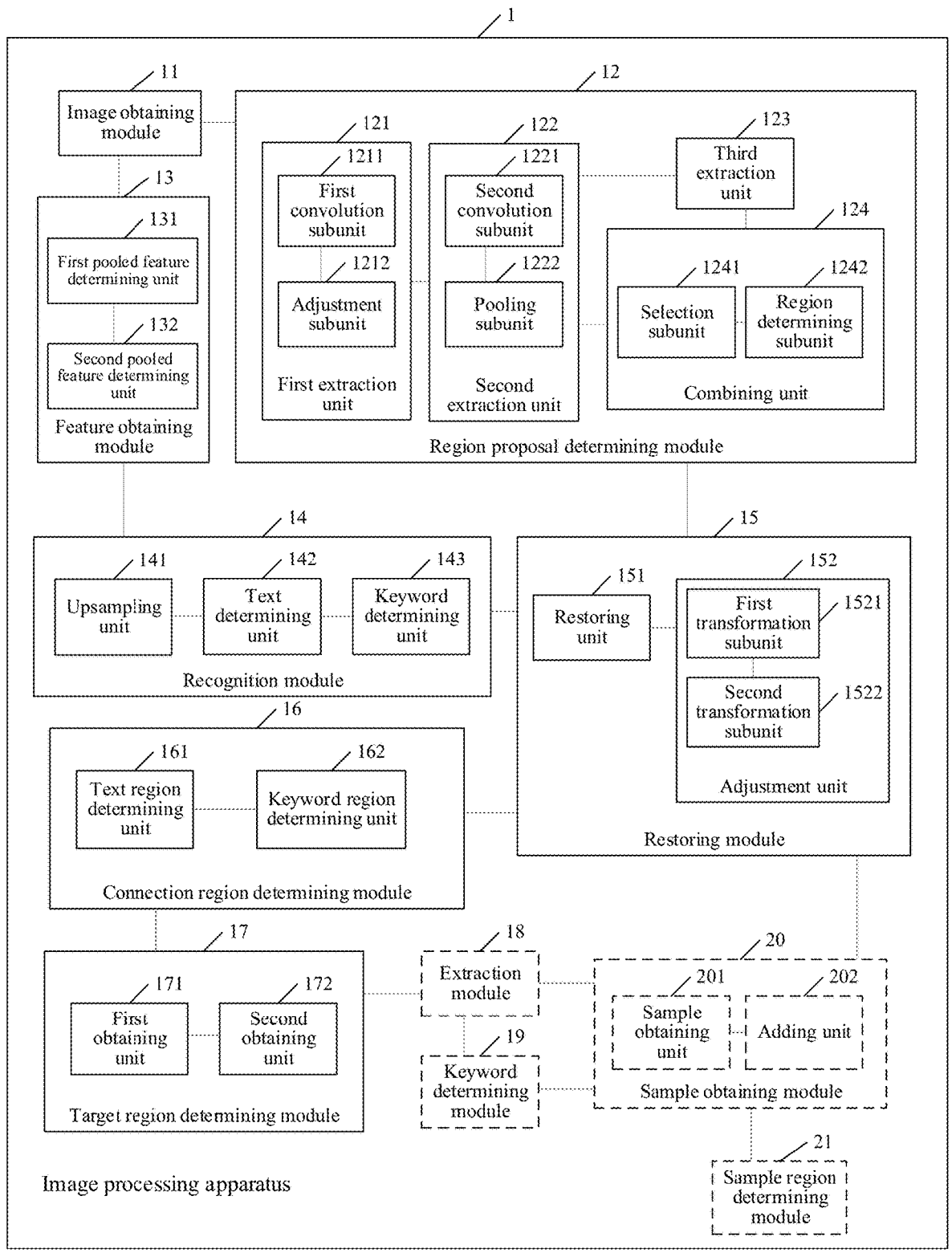
FIG. 11 is a schematic structural diagram of an image processing apparatus according to one or more embodiments of the present disclosure.

Further, FIG. 11 is a schematic structural diagram of an image processing apparatus according to an embodiment of the present disclosure. As shown in FIG. 11, the image processing apparatus 1 is applicable to the terminal device in the foregoing embodiments corresponding FIG. 3 to FIG. 10. The image processing apparatus 1 may include: an image obtaining module 11, a region proposal determining module 12, a feature obtaining module 13, a recognition module 14, a restoring module 15, a connection region determining module 16, and a target region determining module 17.

The image obtaining module 11 is configured to obtain a target image including a text object.

The region proposal determining module 12 is configured to determine a region proposal in which the text object is located in the target image.

The feature obtaining module 13 is configured to obtain region proposal feature information of the region proposal.

The recognition module 14 is configured to generate an initial mask according to the region proposal feature information.

The restoring module 15 is configured to restore the initial mask to a target binary mask.

The connection region determining module 16 is configured to determine a mask connection region in the target binary mask.

The target region determining module 17 is configured to determine a text image region associated with the text object in the target image according to the mask connection region.

For specific function implementations of the image obtaining module 11, the region proposal determining module 12, the feature obtaining module 13, the recognition module 14, the restoring module 15, the connection region determining module 16, and the target region determining module 17, reference may be made to steps S101 to S103 in the foregoing embodiment corresponding to FIG. 3, and details are not described herein again.

Referring to FIG. 11, the initial mask includes a text background mask and a keyword background mask.

The recognition module 14 may include: an upsampling unit 141, a text determining unit 142, and a keyword determining unit 143.

The upsampling unit 141 is configured to perform upsampling on the region proposal feature information to obtain input feature information.

The text determining unit 142 is configured to perform convolution on the input feature information based on a convolutional layer in a text detection network to obtain the text background mask.

The keyword determining unit 143 is configured to perform convolution on the input feature information based on a convolutional layer in a keyword detection network to obtain the keyword background mask.

For specific function implementations of the upsampling unit 141, the text determining unit 142, and the keyword determining unit 143, reference may be made to steps S201 to S203 in the foregoing embodiment corresponding to FIG. 5, and details are not described herein again.

Referring to FIG. 11, the restoring module 15 may include: a restoring unit 151 and an adjustment unit 152.

The restoring unit 151 is configured to perform interpolation on the initial mask to obtain a mask matrix having the same size as the target image.

The adjustment unit 152 is configured to adjust a value of a probability matrix element less than or equal to a preset mask threshold in the mask matrix to a first value, and adjust a value of a probability matrix element greater than the preset mask threshold in the mask matrix to a second value, to obtain the target binary mask.

The initial mask includes a text background mask and a keyword background mask, and the mask matrix includes a text matrix and a first keyword matrix.

The restoring unit 151 is specifically configured to perform interpolation respectively on the text background mask and the keyword background mask to obtain the text matrix corresponding to the text background mask and the first keyword matrix corresponding to the keyword background mask.

For specific function implementations of the restoring unit 151 and the adjustment unit 152, reference may be made to steps S301 and S302 in the foregoing embodiment corresponding to FIG. 6, and details are not described herein again.

The target binary mask includes a text background binary mask and a keyword background binary mask.

Referring to FIG. 11, the adjustment unit 152 may include: a first transformation subunit 1521 and a second transformation subunit 1522.

The first transformation subunit 1521 is configured to adjust, when or in response to determining the mask matrix is the text matrix, a value of a probability matrix element less than or equal to the preset mask threshold in the text matrix to the first value, and adjust a value of a probability matrix element greater than the preset mask threshold in the text matrix to the second value, to obtain the text background binary mask corresponding to the text background mask.

The second transformation subunit 1522 is configured to adjust, when or in response to determining the mask matrix is the first keyword matrix, a value of a probability matrix element less than or equal to the preset mask threshold in the first keyword matrix to the first value, and adjust a value of a probability matrix element greater than the preset mask threshold in the first keyword matrix to the second value, to obtain the keyword background binary mask corresponding to the keyword background mask.

For specific function implementations of the first transformation subunit 1521 and the second transformation subunit 1522, reference may be made to step S302 in the foregoing embodiment corresponding to FIG. 6, and details are not described herein again.

The mask connection region includes a text connection region corresponding to the text background binary mask and a keyword connection region corresponding to the keyword background binary mask, and the text background binary mask and the keyword background binary mask are target binary masks.

Referring to FIG. 11, the connection region determining module 16 may include: a text region determining unit 161 and a keyword region determining unit 162.

The text region determining unit 161 is configured to determine a connection region including probability matrix elements of the first value in the text background binary mask, as the text connection region.

The keyword region determining unit 162 is configured to determine a connection region including probability matrix elements of the first value in the keyword background binary mask, as the keyword connection region.

For specific function implementations of the text region determining unit 161 and the keyword region determining unit 162, reference may be made to steps S303 and S304 in the foregoing embodiment corresponding to FIG. 6, and details are not described herein again.

The text image region associated with the text object includes a text region and a keyword region.

Referring to FIG. 11, the target region determining module 17 may include: a first obtaining unit 171 and a second obtaining unit 172.

The first obtaining unit 171 is configured to obtain first location information of a minimum rectangle including the text connection region in the text background binary mask, and use an image region corresponding to the first location information in the target image as the text region.

The second obtaining unit 172 is configured to obtain second location information of a minimum rectangle including the keyword connection region in the keyword background binary mask, and use an image region corresponding to the second location information in the target image as the keyword region.

For specific function implementations of the first obtaining unit 171 and the second obtaining unit 172, reference may be made to steps S305 and S306 in the foregoing embodiment corresponding to FIG. 9, and details are not described herein again.

The initial mask further includes keyword category masks respectively corresponding to a plurality of preselected keywords.

Referring to FIG. 11, the image processing apparatus 1 may further include: an extraction module 18 and a keyword determining module 19.

The extraction module 18 is configured to perform interpolation on the keyword category masks to obtain second keyword matrices having the same size as the target image.

The extraction module 18 is further configured to extract second keyword submatrices corresponding to the keyword connection region from the second keyword matrices, and determine confidence levels corresponding to the keyword category masks according to the second keyword submatrix.

The keyword determining module 19 is configured to determine a preselected keyword corresponding to a keyword category mask having the largest confidence level as a target keyword corresponding to the keyword region, and mark the target keyword in the target image.

For specific function implementations of the extraction module 18 and the keyword determining module 19, reference may be made to step S306 in the foregoing embodiment corresponding to FIG. 6, and details are not described herein again.

Referring to FIG. 11, the region proposal determining module 12 may include: a first extraction unit 121, a second extraction unit 122, a third extraction unit 123, and a combining unit 124.

The first extraction unit 121 is configured to extract hierarchical convolved feature information of the target image based on a target FPN, the hierarchical convolved feature information including first convolved feature information corresponding to a first size and second convolved feature information corresponding to a second size.

The second extraction unit 122 is configured to determine a first ROI from the first convolved feature information based on a target RPN.

The third extraction unit 123 is configured to determine a second ROI from the second convolved feature information based on the target RPN.

The combining unit 124 is configured to select the region proposal from an ROI set including the first ROI and the second ROI.

For specific function implementations of the first extraction unit 121, the second extraction unit 122, the third extraction unit 123, and the combining unit 124, reference may be made to steps S101 in the foregoing embodiment corresponding to FIG. 3, and details are not described herein again.

Referring to FIG. 11, the first extraction unit 121 may include: a first convolution subunit 1211 and an adjustment subunit 1212.

The first convolution subunit 1211 is configured to perform convolution on the target image based on a first convolutional layer in the target FPN to obtain first original feature information.

The first convolution subunit 1211 is further configured to perform convolution on the first original feature information based on a second convolutional layer in the target FPN to obtain second original feature information.

The adjustment subunit 1212 is configured to adjust a quantity of data channels of the first original feature information to obtain first transformed feature information.

The adjustment subunit 1212 is further configured to adjust a quantity of data channels of the second original feature information to obtain second transformed feature information, the first transformed feature information and the second transformed feature information having the same quantity of data channels.

The adjustment subunit 1212 is further configured to perform upsampling on the second transformed feature information to obtain third transformed feature information.

The adjustment subunit 1212 is further configured to superpose the third transformed feature information and the first transformed feature information to obtain fourth transformed feature information.

The adjustment subunit 1212 is further configured to determine the fourth transformed feature information as the first convolved feature information, and determine the second transformed feature information as the second convolved feature information.

For specific function implementations of the first convolution subunit 1211 and the adjustment subunit 1212, reference may be made to step S101 in the foregoing embodiment corresponding to FIG. 3, and details are not described herein again.

Referring to FIG. 11, the second extraction unit 122 may include: a second convolution subunit 1221 and a pooling subunit 1222.

The second convolution subunit 1221 is configured to perform convolution on the first convolved feature information based on a convolutional layer in the target RPN to obtain regional convolved feature information, and determine a plurality of pieces of unit regional convolved feature information in the regional convolved feature information according to a size factor corresponding to the first size.

The pooling subunit 1222 is configured to perform pooling on the plurality of pieces of unit regional convolved feature information respectively based on a pooling layer in the target RPN to obtain a plurality of pieces of first pooled feature information.

The pooling subunit 1222 is further configured to determine a foreground factor corresponding to each piece of first pooled feature information based on a classifier in the target RPN.

The pooling subunit 1222 is further configured to determine a region offset factor corresponding to the each piece of first pooled feature information based on a regressor in the target RPN.

The pooling subunit 1222 is further configured to use first pooled feature information with a foreground factor greater than a factor threshold as a to-be-determined pooled feature information, and map the to-be-determined pooled feature information onto the target image according to the size factor and a region offset factor corresponding to the to-be-determined pooled feature information to obtain the first ROI.

For specific function implementations of the second convolution subunit 1221 and the pooling subunit 1222, reference may be made to step S101 in the foregoing embodiment corresponding to FIG. 3, and details are not described herein again.

Referring to FIG. 11, the combining unit 124 may include a selection subunit 1241 and a region determining subunit 1242.

The selection subunit 1241 is configured to combine the first ROI and the second ROI into the ROI set.

The selection subunit 1241 is further configured to obtain a foreground factor of each ROI in the ROI set, select an ROI corresponding to the largest foreground factor from the ROI set as a polling ROI, and combine, in a plurality of ROIs included in the ROI set, ROIs whose overlapping areas with the polling ROI are less than an area threshold into an ROI set.

The region determining subunit 1242 is configured to determine all polling region proposals as region proposals when or in response to determining the ROI set is an empty set.

For specific function implementations of the selection subunit 1241 and the region determining subunit 1242, reference may be made to step S101 in the foregoing embodiment corresponding to FIG. 3, and details are not described herein again.

Referring to FIG. 11, the feature obtaining module 13 may include: a first pooled feature determining unit 131 and a second pooled feature determining unit 132.

The first pooled feature determining unit 131 is configured to determine second pooled feature information corresponding to the second convolved feature information based on the convolutional layer and the pooling layer in the target RPN.

The second pooled feature determining unit 132 is configured to extract pooled feature information corresponding to the region proposal from the first pooled feature information and the second pooled feature information as the region proposal feature information.

For specific function implementations of the first pooled feature determining unit 131 and the second pooled feature determining unit 132, reference may be made to step S102 in the foregoing embodiment corresponding to FIG. 3, and details are not described herein again.

Referring to FIG. 11, the image processing apparatus 1 may further include: a sample obtaining module 20 and a sample region determining module 21.

The sample obtaining module 20 is configured to obtain a text image sample including a sample text object, the sample text object including a preselected sample keyword.

The sample region determining module 21 is configured to determine a sample region proposal in which the sample text object is located in the text image sample, and obtain sample region proposal feature information of the sample region proposal.

The sample region determining module 21 is further configured to recognize a predicted region in which the sample text object is located in the text image sample according to the sample region proposal feature information, and recognize a predicted sample keyword corresponding to the predicted region.

The sample region determining module 21 is further configured to obtain a sample region in which the sample text object is located in the text image sample.

The sample region determining module 21 is further configured to determine a prediction error according to the predicted region, the sample region, the preselected sample keyword, and the predicted sample keyword.

The sample region determining module 21 is further configured to generate a target FPN, a target RPN, a text detection network, and a keyword detection network according to the prediction error, the target FPN, the target RPN, the text detection network, and the keyword detection network being configured to recognize the text image region associated with the text object in the target image.

For specific function implementations of the sample obtaining module 20 and the sample region determining module 21, reference may be made to step S418 in the foregoing embodiment corresponding to FIG. 9, and details are not described herein again.

Referring to FIG. 11, the sample obtaining module 20 may include: a sample obtaining unit 201 and an adding unit 202.

The sample obtaining unit 201 is configured to obtain an image sample and a sample text object including the preselected sample keyword.

The adding unit 202 is configured to add the sample text object to the image sample to obtain the text image sample.

For specific function implementations of the sample obtaining unit 201 and the adding unit 202, reference may be made to step S418 in the foregoing embodiment corresponding to FIG. 9, and details are not described herein again.

Figure 12:
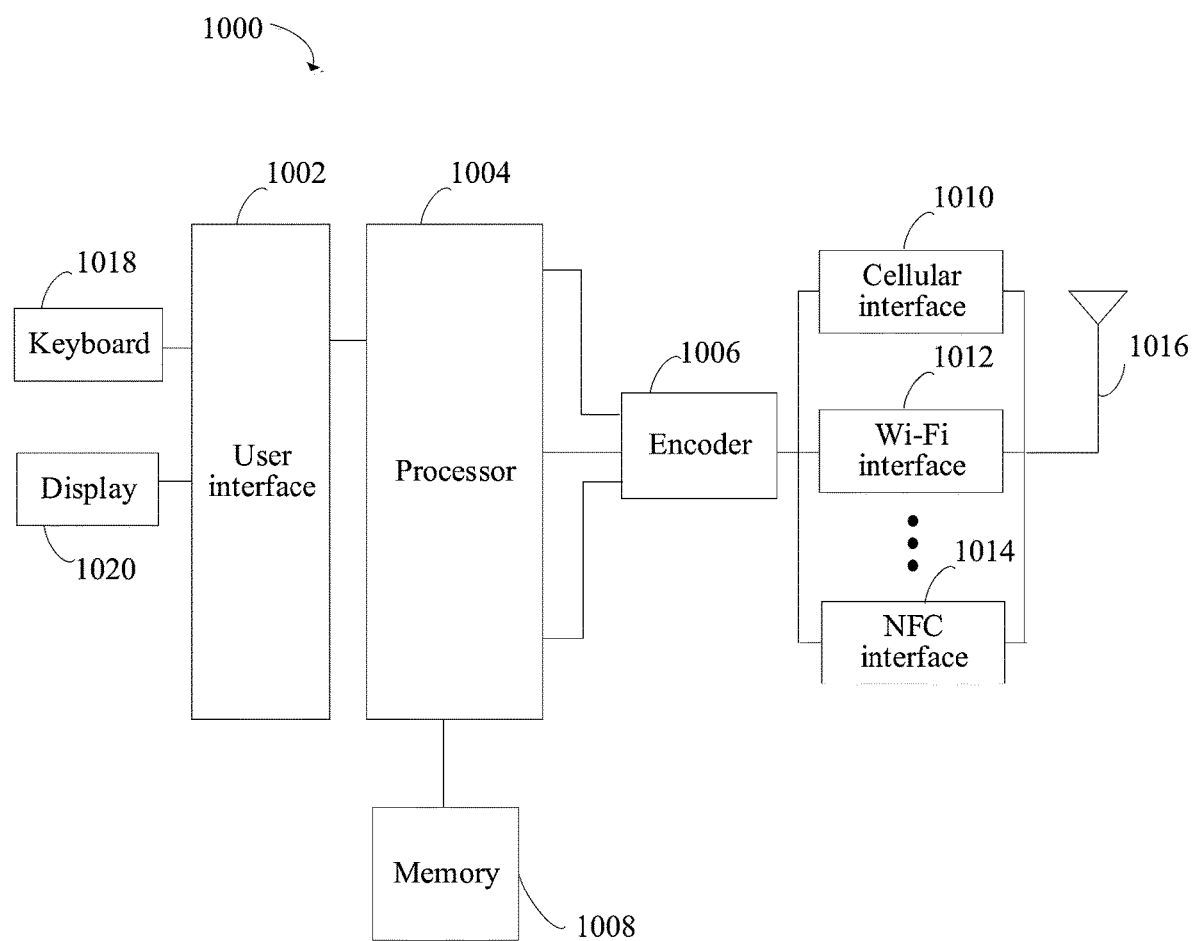
FIG. 12 is a schematic structural diagram of an electronic device according to one or more embodiments of the present disclosure.

Further, FIG. 12 is a schematic structural diagram of an electronic device according to an embodiment of the present disclosure. The terminal device in the embodiments corresponding to FIG. 3 to FIG. 10 may be an electronic device 1000. As shown in FIG. 12, the electronic device 1000 may include: a user interface 1002, a processor 1004, an encoder 1006, and a memory 1008. A signal receiver 1016 is configured to receive or transmit data by using a cellular interface 1010, a WIFI interface 1012, an NFC interface 1014, or the like.

The encoder 1006 encodes received data in a data format processed by a computer. The memory 1008 stores a computer program, and the processor 1004 is configured to perform steps in any one of the method embodiments through the computer program. The memory 1008 may include a volatile memory (such as a dynamic random access memory (DRAM)), and may further include a non-volatile memory (such as a one-time programmable read-only memory (OTPROM)). In some instances, the memory 1008 may further include memories remotely disposed relative to the processor 1004, and these remote memories may be connected to the electronic device 1000 through a network. The user interface 1002 may include a keyboard 1018 and a display 1020.

In the electronic device 1000 shown in FIG. 12, the processor 1004 may be configured to invoke the computer program stored in the memory 1008, to implement the following steps: obtaining a target image including a text object, and determining a region proposal in which the text object is located in the target image; obtaining region proposal feature information of the region proposal, and generating an initial mask according to the region proposal feature information; and restoring the initial mask to a target binary mask, determining a mask connection region in the target binary mask, and determining a text image region associated with the text object in the target image according to the mask connection region.

In an embodiment, the initial mask includes a text background mask and a keyword background mask.

When generating the initial mask according to the region proposal feature information, the processor 1004 specifically performs the following steps: performing upsampling on the region proposal feature information to obtain input feature information; performing convolution on the input feature information based on a convolutional layer in a text detection network to obtain the text background mask; and performing convolution on the input feature information based on a convolutional layer in a keyword detection network to obtain the keyword background mask.

In an embodiment, when restoring the initial mask to the target binary mask, the processor 1004 specifically performs the following steps: performing interpolation on the initial mask to obtain a mask matrix having the same size as the target image; and adjusting a value of a probability matrix element less than or equal to a preset mask threshold in the mask matrix to a first value, and adjusting a value of a probability matrix element greater than the preset mask threshold in the mask matrix to a second value, to obtain the target binary mask.

In an embodiment, the initial mask includes a text background mask and a keyword background mask, and the mask matrix includes a text matrix and a first keyword matrix.

When performing interpolation on the initial mask to obtain the mask matrix having the same size as the target image, the processor 1004 specifically performs the following step: performing interpolation respectively on the text background mask and the keyword background mask to obtain the text matrix corresponding to the text background mask and the first keyword matrix corresponding to the keyword background mask.

In an embodiment, the target binary mask includes a text background binary mask and a keyword background binary mask.

When adjusting the value of the probability matrix element less than or equal to the preset mask threshold in the mask matrix to the first value, and adjusting the value of the probability matrix element greater than the preset mask threshold in the mask matrix to the second value, to obtain the target binary mask, the processor 1004 specifically performs the following steps: adjusting, when or in response to determining the mask matrix is the text matrix, a value of a probability matrix element less than or equal to the preset mask threshold in the text matrix to the first value, and adjusting a value of a probability matrix element greater than the preset mask threshold in the text matrix to the second value, to obtain the text background binary mask corresponding to the text background mask; and adjusting, when or in response to determining the mask matrix is the first keyword matrix, a value of a probability matrix element less than or equal to the preset mask threshold in the first keyword matrix to the first value, and adjusting a value of a probability matrix element greater than the preset mask threshold in the first keyword matrix to the second value, to obtain the keyword background binary mask corresponding to the keyword background mask.

In an embodiment, the mask connection region includes a text connection region corresponding to the text background binary mask and a keyword connection region corresponding to the keyword background binary mask, and the text background binary mask and the keyword background binary mask are target binary masks.

When determining the mask connection region in the target binary mask, the processor 1004 specifically performs the following steps: determining a connection region including probability matrix elements of the first value in the text background binary mask, as the text connection region; and determining a connection region including probability matrix elements of the first value in the keyword background binary mask, as the keyword connection region.

In an embodiment, the text image region associated with the text object includes a text region and a keyword region.

When determining the text image region associated with the text object in the target image according to the mask connection region, the processor 1004 specifically performs the following steps: obtaining first location information of a minimum rectangle including the text connection region in the text background binary mask, and using an image region corresponding to the first location information in the target image as the text region; and obtaining second location information of a minimum rectangle including the keyword connection region in the keyword background binary mask, and using an image region corresponding to the second location information in the target image as the keyword region.

In an embodiment, the initial mask further includes keyword category masks respectively corresponding to a plurality of preselected keywords.

The processor 1004 further performs the following steps: performing interpolation on the keyword category masks to obtain second keyword matrices having the same size as the target image; extracting second keyword submatrices corresponding to the keyword connection region from the second keyword matrices, and determining confidence levels corresponding to the keyword category masks according to the second keyword submatrix; and determining a preselected keyword corresponding to a keyword category mask having the largest confidence level as a target keyword corresponding to the keyword region, and marking the target keyword in the target image.

In an embodiment, when determining the region proposal in which the text object is located in the target image, the processor 1004 specifically performs the following operations: extracting hierarchical convolved feature information of the target image based on a target FPN, the hierarchical convolved feature information including first convolved feature information corresponding to a first size and second convolved feature information corresponding to a second size; determining a first ROI from the first convolved feature information based on a target RPN; determining a second ROI from the second convolved feature information based on the target RPN; and selecting the region proposal from an ROI set including the first ROI and the second ROI.

In an embodiment, when extracting the hierarchical convolved feature information of the target image based on the target FPN, the processor 1004 specifically performs the following steps: performing convolution on the target image based on a first convolutional layer in the target FPN to obtain first original feature information; performing convolution on the first original feature information based on a second convolutional layer in the target FPN to obtain second original feature information; adjusting a quantity of data channels of the first original feature information to obtain first transformed feature information; adjusting a quantity of data channels of the second original feature information to obtain second transformed feature information, the first transformed feature information and the second transformed feature information having the same quantity of data channels; performing upsampling on the second transformed feature information to obtain third transformed feature information; superposing the third transformed feature information and the first transformed feature information to obtain fourth transformed feature information; and determining the fourth transformed feature information as the first convolved feature information, and determining the second transformed feature information as the second convolved feature information.

In an embodiment, when determining the first ROI from the first convolved feature information based on the target RPN, the processor 1004 specifically performs the following steps: performing convolution on the first convolved feature information based on a convolutional layer in the target RPN to obtain regional convolved feature information, and determining a plurality of pieces of unit regional convolved feature information in the regional convolved feature information according to a size factor corresponding to the first size; performing pooling on the plurality of pieces of unit regional convolved feature information respectively based on a pooling layer in the target RPN to obtain a plurality of pieces of first pooled feature information; determining a foreground factor corresponding to each piece of first pooled feature information based on a classifier in the target RPN; determining a region offset factor corresponding to the each piece of first pooled feature information based on a regressor in the target RPN; and using first pooled feature information with a foreground factor greater than a factor threshold as a to-be-determined pooled feature information, and mapping the to-be-determined pooled feature information onto the target image according to the size factor and a region offset factor corresponding to the to-be-determined pooled feature information to obtain the first ROI.

In an embodiment, when selecting the region proposal from the ROI set including the first ROI and the second ROI, the processor 1004 specifically performs the following steps: combining the first ROI and the second ROI into the ROI set; obtaining a foreground factor of each ROI in the ROI set, selecting an ROI corresponding to the largest foreground factor from the ROI set as a polling ROI, and combining, in a plurality of ROIs included in the ROI set, ROIs whose overlapping areas with the polling ROI are less than an area threshold into an ROI set; and determining all polling region proposals as region proposals when or in response to determining the ROI set is an empty set.

In an embodiment, when obtain the region proposal feature information of the region proposal, the processor 1004 specifically performs the following operations: determining second pooled feature information corresponding to the second convolved feature information based on the convolutional layer and the pooling layer in the target RPN; and extracting pooled feature information corresponding to the region proposal from the first pooled feature information and the second pooled feature information as the region proposal feature information.

In an embodiment, the processor 1004 further performs the following steps: obtaining a text image sample including a sample text object, the sample text object including a preselected sample keyword; determining a sample region proposal in which the sample text object is located in the text image sample, and obtaining sample region proposal feature information of the sample region proposal; recognizing a predicted region in which the sample text object is located in the text image sample according to the sample region proposal feature information, and recognizing a predicted sample keyword corresponding to the predicted region; obtaining a sample region in which the sample text object is located in the text image sample; determining a prediction error according to the predicted region, the sample region, the preselected sample keyword, and the predicted sample keyword; and generating a target FPN, a target RPN, a text detection network, and a keyword detection network according to the prediction error, the target FPN, the target RPN, the text detection network, and the keyword detection network being configured to recognize the text image region associated with the text object in the target image.

In certain embodiments, the electronic device 1000 may implement the descriptions of the image processing method in the foregoing embodiments corresponding to FIG. 3 to FIG. 10, and the descriptions of the image processing apparatus 1 in the foregoing embodiment corresponding to FIG. 11. Details are not described herein again. In addition, the descriptions of beneficial effects of using the same method are not described herein again.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

In addition, an embodiment of the present disclosure further provides a computer storage medium. The computer storage medium stores a computer program executed by the image processing apparatus 1 mentioned above, and the computer program includes program instructions. When executing the program instructions, the processor can implement the descriptions of the image processing method in the foregoing embodiments corresponding to FIG. 3 to FIG. 10. Therefore, details are not described herein again. In addition, the descriptions of beneficial effects of using the same method are not described herein again. For technical details that are not disclosed in the computer storage medium embodiment of the present disclosure, refer to the descriptions of the method embodiments of the present disclosure.

A person of ordinary skill in the art may understand that all or some of procedures of the method in the foregoing embodiments may be implemented by a computer program instructing relevant hardware. The program may be stored in a computer-readable storage medium. When the program is executed, the procedures of the foregoing method embodiments may be implemented. The storage medium may be a magnetic disc, an optical disc, a read-only memory (ROM), a random access memory (RAM), or the like.

What is disclosed above is merely exemplary embodiments of the present disclosure, and is not necessarily intended to limit the scope of the claims of the present disclosure. Therefore, equivalent variations made in accordance with the claims of the present disclosure shall fall within the scope of the present disclosure.

What is claimed is:

1. An image processing method, performed by an electronic device, the method comprising:
   obtaining a target image including a text object, and determining a region proposal in the target image corresponding to the text object;
   obtaining region proposal feature information of the region proposal, and generating an initial mask according to the region proposal feature information; and
   restoring the initial mask to a target binary mask, determining a mask connection region in the target binary mask, and determining a text image region associated with the text object in the target image according to the mask connection region,
   wherein the initial mask includes a text background mask and a keyword background mask, and generating an initial mask according to the region proposal feature information comprises:
      performing upsampling on the region proposal feature information to obtain input feature information;
      performing convolution on the input feature information based on a convolutional layer in a text detection network to obtain the text background mask; and
      performing convolution on the input feature information based on a convolutional layer in a keyword detection network to obtain the keyword background mask.

2. The method according to claim 1, wherein restoring the initial mask to the target binary mask comprises:
   performing interpolation on the initial mask to obtain a mask matrix having the same size as the target image, the mask matrix includes at least one of a text matrix or a first keyword matrix; and
   adjusting a value of a probability matrix element in the mask matrix less than or equal to a preset mask threshold to a first value, and adjusting a value of a probability matrix element in the mask matrix greater than the preset mask threshold to a second value, to obtain the target binary mask, wherein a value of a probability matrix element in the text matrix represents a probability that a corresponding target pixel has a non-text attribute, and a value of a probability matrix element in the first keyword matrix represents a probability that a corresponding target pixel has a non-keyword attribute.

3. The method according to claim 2, wherein the initial mask includes a text background mask and a keyword background mask; and
   performing interpolation on the initial mask to obtain a mask matrix having the same size as the target image comprises:
      performing interpolation respectively on the text background mask and the keyword background mask to obtain the text matrix corresponding to the text background mask and the first keyword matrix corresponding to the keyword background mask.

4. The method according to claim 3, wherein the target binary mask includes a text background binary mask and a keyword background binary mask; and
   adjusting the value of a probability matrix element in the mask matrix comprises:
      adjusting, in response to determining the mask matrix is the text matrix, a value of a probability matrix element in the mask matrix less than or equal to the preset mask threshold in the text matrix to the first value, and adjusting a value of a probability matrix element in the mask matrix greater than the preset mask threshold in the text matrix to the second value, to obtain the text background binary mask corresponding to the text background mask; and
      adjusting, in response to determining the mask matrix is the first keyword matrix, a value of a probability matrix element in the mask matrix less than or equal to the preset mask threshold in the first keyword matrix to the first value, and adjusting a value of a probability matrix element in the mask matrix greater than the preset mask threshold in the first keyword matrix to the second value, to obtain the keyword background binary mask corresponding to the keyword background mask.

5. The method according to claim 4, wherein the mask connection region includes a text connection region corresponding to the text background binary mask and a keyword connection region corresponding to the keyword background binary mask, and the text background binary mask and the keyword background binary mask are target binary masks; and
   determining a mask connection region in the target binary mask comprises:
      determining a connection region comprising probability matrix elements of the first value in the text background binary mask, as the text connection region; and
      determining a connection region comprising probability matrix elements of the first value in the keyword background binary mask, as the keyword connection region.

6. The method according to claim 5, wherein the text image region associated with the text object includes a text region and a keyword region; and
   determining the text image region associated with the text object in the target image according to the mask connection region comprises:
      obtaining first location information of a minimum rectangle comprising the text connection region in the text background binary mask, and using an image region corresponding to the first location information in the target image as the text region; and
      obtaining second location information of a minimum rectangle comprising the keyword connection region in the keyword background binary mask, and using an image region corresponding to the second location information in the target image as the keyword region.

7. The method according to claim 6, wherein the initial mask further includes keyword category masks respectively corresponding to a plurality of preselected keywords; and
   the method further comprises:
      performing interpolation on the keyword category masks to obtain second keyword matrices having the same size as the target image;
      extracting second keyword submatrices corresponding to the keyword connection region from the second keyword matrices, and determining confidence levels corresponding to the keyword category masks according to the second keyword submatrix; and
      determining a preselected keyword corresponding to a keyword category mask having the largest confidence level as a target keyword corresponding to the keyword region, and marking the target keyword in the target image.

8. The method according to claim 1, wherein determining the region proposal in which the text object is located in the target image comprises:
- extracting hierarchical convolved feature information of the target image based on a target feature pyramid network (FPN), the hierarchical convolved feature information comprising first convolved feature information corresponding to a first size and second convolved feature information corresponding to a second size;
- determining a first region of interest (ROI) from the first convolved feature information based on a target region proposal network (RPN);
- determining a second ROI from the second convolved feature information based on the target RPN; and
- selecting the region proposal from an ROI set comprising the first ROI and the second ROI.

9. The method according to claim 8, wherein extracting hierarchical convolved feature information of the target image based on the target FPN comprises:
- performing convolution on the target image based on a first convolutional layer in the target FPN to obtain first original feature information;
- performing convolution on the first original feature information based on a second convolutional layer in the target FPN to obtain second original feature information;
- adjusting a quantity of data channels of the first original feature information to obtain first transformed feature information;
- adjusting a quantity of data channels of the second original feature information to obtain second transformed feature information, the first transformed feature information and the second transformed feature information having the same quantity of data channels;
- performing upsampling on the second transformed feature information to obtain third transformed feature information; and
- superposing the third transformed feature information and the first transformed feature information to obtain fourth transformed feature information; and
- determining the fourth transformed feature information as the first convolved feature information, and determining the second transformed feature information as the second convolved feature information.

10. The method according to claim 8, wherein determining a first ROI from the first convolved feature information based on the target RPN comprises:
- performing convolution on the first convolved feature information based on a convolutional layer in the target RPN to obtain regional convolved feature information, and determining a plurality of pieces of unit regional convolved feature information in the regional convolved feature information according to a size factor corresponding to the first size;
- performing pooling on the plurality of pieces of unit regional convolved feature information respectively based on a pooling layer in the target RPN to obtain a plurality of pieces of first pooled feature information;
- determining a foreground factor corresponding to each piece of first pooled feature information based on a classifier in the target RPN;
- determining a region offset factor corresponding to the each piece of first pooled feature information based on a regressor in the target RPN; and
- using first pooled feature information with a foreground factor greater than a factor threshold as a to-be-determined pooled feature information, and mapping the to-be-determined pooled feature information onto the target image according to the size factor and a region offset factor corresponding to the to-be-determined pooled feature information to obtain the first ROI.

11. The method according to claim 10, wherein obtaining region proposal feature information of the region proposal comprises:
- determining second pooled feature information corresponding to the second convolved feature information based on the convolutional layer and the pooling layer in the target RPN; and
- extracting pooled feature information corresponding to the region proposal from the first pooled feature information and the second pooled feature information as the region proposal feature information.

12. The method according to claim 8, wherein selecting the region proposal from the ROI set comprises:
- combining the first ROI and the second ROI into the ROI set;
- obtaining a foreground factor of each ROI in the ROI set, selecting an ROI corresponding to the largest foreground factor from the ROI set as a polling ROI, and combining, in a plurality of ROIs comprised in the ROI set, ROIs whose overlapping areas with the polling ROI are less than an area threshold into an ROI set; and
- determining all polling region proposals as region proposals in response to determining the ROI set is an empty set.

13. The method according to claim 1, further comprising:
- obtaining a text image sample comprising a sample text object, the sample text object comprising a preselected sample keyword;
- determining a sample region proposal in which the sample text object is located in the text image sample, and obtaining sample region proposal feature information of the sample region proposal;
- recognizing a predicted region in which the sample text object is located in the text image sample according to the sample region proposal feature information, and recognizing a predicted sample keyword corresponding to the predicted region;
- obtaining a sample region in which the sample text object is located in the text image sample;
- determining a prediction error according to the predicted region, the sample region, the preselected sample keyword, and the predicted sample keyword; and
- generating a target feature pyramid network (FPN), a target region proposal network (RPN), a text detection network, and a keyword detection network according to the prediction error, the target FPN, the target RPN, the text detection network, and the keyword detection network being configured to recognize the text image region associated with the text object in the target image.

14. An image processing apparatus, comprising: a memory storing computer program instructions; and a processor coupled to the memory and configured to execute the computer program instructions and perform:
- obtaining a target image including a text object, and determining a region proposal in the target image corresponding to the text object;
- obtaining region proposal feature information of the region proposal, and generating an initial mask according to the region proposal feature information; and
- restoring the initial mask to a target binary mask, determining a mask connection region in the target binary mask, and determining a text image region associated with the text object in the target image according to the mask connection region, wherein the initial mask includes a text background mask and a keyword background mask, and generating an initial mask according to the region proposal feature information comprises:

performing upsampling on the region proposal feature information to obtain input feature information;

performing convolution on the input feature information based on a convolutional layer in a text detection network to obtain the text background mask; and performing convolution on the input feature information based on a convolutional layer in a keyword detection network to obtain the keyword background mask.

15. The image processing apparatus according to claim 14, wherein the processor is further configured to execute the computer program instructions and perform:

performing interpolation on the initial mask to obtain a mask matrix having the same size as the target image, the mask matrix includes at least one of a text matrix or a first keyword matrix; and adjusting a value of a probability matrix element in the mask matrix less than or equal to a preset mask threshold to a first value, and adjusting a value of a probability matrix element in the mask matrix greater than the preset mask threshold to a second value, to obtain the target binary mask, wherein a value of a probability matrix element in the text matrix represents a probability that a corresponding target pixel has a non-text attribute, and a value of a probability matrix element in the first keyword matrix represents a probability that a corresponding target pixel has a non-keyword attribute.

16. The image processing apparatus according to claim 15, wherein the initial mask includes a text background mask and a keyword background mask, and wherein the processor is further configured to execute the computer program instructions and perform:

performing interpolation respectively on the text background mask and the keyword background mask to obtain the text matrix corresponding to the text background mask and the first keyword matrix corresponding to the keyword background mask.

17. The image processing apparatus according to claim 16, wherein the target binary mask includes a text background binary mask and a keyword background binary mask, wherein the processor is further configured to execute the computer program instructions and perform:

adjusting, in response to determining the mask matrix is the text matrix, a value of a probability matrix element in the mask matrix less than or equal to the preset mask threshold in the text matrix to the first value, and adjusting a value of a probability matrix element in the mask matrix greater than the preset mask threshold in the text matrix to the second value, to obtain the text background binary mask corresponding to the text background mask; and adjusting, in response to determining the mask matrix is the first keyword matrix, a value of a probability matrix element in the mask matrix less than or equal to the preset mask threshold in the first keyword matrix to the first value, and adjusting a value of a probability matrix element in the mask matrix greater than the preset mask threshold in the first keyword matrix to the second value, to obtain the keyword background binary mask corresponding to the keyword background mask.

18. A non-transitory computer-readable storage medium storing computer program instructions executable by at least one processor to perform:

obtaining a target image including a text object, and determining a region proposal in the target image corresponding to the text object;

obtaining region proposal feature information of the region proposal, and generating an initial mask according to the region proposal feature information; and restoring the initial mask to a target binary mask, determining a mask connection region in the target binary mask, and determining a text image region associated with the text object in the target image according to the mask connection region, wherein the initial mask includes a text background mask and a keyword background mask, and generating an initial mask according to the region proposal feature information comprises:

performing upsampling on the region proposal feature information to obtain input feature information;

performing convolution on the input feature information based on a convolutional layer in a text detection network to obtain the text background mask; and performing convolution on the input feature information based on a convolutional layer in a keyword detection network to obtain the keyword background mask.

* * * * *